United States Patent
Garg et al.

(10) Patent No.: US 8,634,295 B2
(45) Date of Patent: Jan. 21, 2014

(54) SYSTEM AND METHOD FOR VOICE AND DATA COMMUNICATION

(75) Inventors: Hari Krishna Garg, Singapore (SG); Rajat Krishna, Singapore (SG); Raj Krishna, Singapore (SG)

(73) Assignee: Manovega Pte Ltd, Singapore (SG)

( * ) Notice: Subject to any disclaimer, the term of this patent is extended or adjusted under 35 U.S.C. 154(b) by 440 days.

(21) Appl. No.: 12/668,268

(22) PCT Filed: Jul. 8, 2008

(86) PCT No.: PCT/SG2008/000243
§ 371 (c)(1),
(2), (4) Date: Jun. 30, 2010

(87) PCT Pub. No.: WO2009/008841
PCT Pub. Date: Jan. 15, 2009

(65) Prior Publication Data
US 2010/0322259 A1    Dec. 23, 2010

Related U.S. Application Data

(60) Provisional application No. 60/929,774, filed on Jul. 12, 2007.

(51) Int. Cl.
*H04L 1/00* (2006.01)
*H04L 12/26* (2006.01)

(52) U.S. Cl.
USPC .......................................................... 370/231

(58) Field of Classification Search
None
See application file for complete search history.

(56) References Cited

U.S. PATENT DOCUMENTS

| 5,511,169 | A | 4/1996 | Suda |
| 6,771,674 | B1 * | 8/2004 | Schuster et al. .............. 370/537 |
| 6,788,686 | B1 | 9/2004 | Khotimsky et al. |
| 7,103,027 | B2 * | 9/2006 | Dick et al. .................... 370/335 |
| 7,200,402 | B2 * | 4/2007 | Apostolopoulos et al. ... 455/442 |
| 8,073,492 | B2 * | 12/2011 | Karaoguz et al. ............ 455/566 |
| 2004/0032910 | A1 | 2/2004 | Horng et al. |
| 2004/0196798 | A1 | 10/2004 | Abousleman |

FOREIGN PATENT DOCUMENTS

| WO | 2005/074159 A1 | 8/2005 |
| WO | 2006/028654 A2 | 3/2006 |

OTHER PUBLICATIONS

Katugampala, N.N., et al., "Real Time Data Transmission Over GSM Voice Channel For Secure Voice & Data Applications"; 13th European Signal Processing Conference EUSIPCO 2005, Turkey; Sep. 4-8, 2005 (4 pages).

International Search Report dated Nov. 3, 2008, issued by the Australian Patent Office in International Application No. PCT/SG2008/000243 (5 pages).

* cited by examiner

*Primary Examiner* — Ayaz Sheikh
*Assistant Examiner* — Blanche Wong
(74) *Attorney, Agent, or Firm* — Osha Liang LLP

(57) ABSTRACT

A method, device, and system for conducting communication over one or more communication networks. The method comprises determining a number, A, of simultaneously receivable communication paths at a receiving device; and selecting, based on A, a version of data for reception from a plurality of available versions.

23 Claims, 28 Drawing Sheets

Notes:
1. For Wireless/Mobile Service Provider the Infrastructure includes Base Station Radio Towers etc.
2. The Links marked with 2 and 3 are usually very high bandwidth links.
3. The Links marked with a thick line are multiple communication links.

Notes:
1. For Wireless/Mobile Service Provider the Infrastructure includes Base Station Radio Towers etc.
2. The Links marked with 2 and 3 are usually very high bandwidth links.
3. The Link marked with a thick line is a multiple communication link.
4. Here all the Links to the User Terminal are provided by the same Service Provider.

Notes:
1. For Wireless/Mobile Service Provider the Infrastructure includes Base Station Radio Towers etc.
2. The Destination Data Server is a part of the Service Provider Infrastructure.
3. The Link marked with a thick line is a multiple communication link.
4. Here all the Links to the User Terminal are provided by the same Service Provider.

Notes:
1. For Wireless/Mobile Service Provider the Infrastructure includes Base Station Radio Towers etc.
2. The Links marked with 2, 3, 4 and 5 are usually very high bandwidth links.
3. The Links marked with a thick line are multiple communication links.

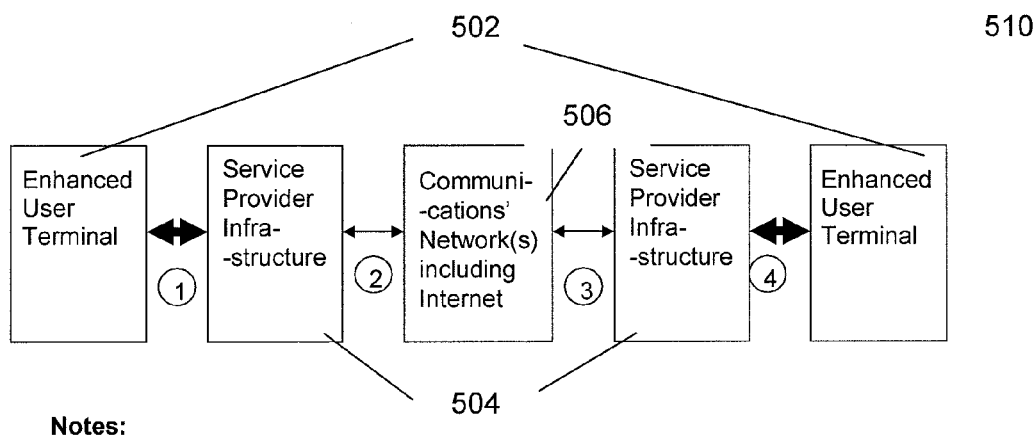

Notes:
1. For Wireless/Mobile Service Provider the Infrastructure includes Base Station Radio Towers etc.
2. The Service Providers for the two User Terminals may or may not be the same.
3. The Links marked with 2 and 3 are usually very high bandwidth links.
4. The Links marked with a thick line are multiple communication links.
5. Here all the Links to each of the User Terminals are provided by the same Service Provider.

Figure 5

Notes:
1. For Wireless/Mobile Service Provider the Infrastructure includes Base Station Radio Towers etc.
2. The Service Providers for the two User Terminals may or may not be the same.
3. The Links marked with 2 and 3 are usually very high bandwidth links.
4. The Links marked with a thick line are multiple communication links.

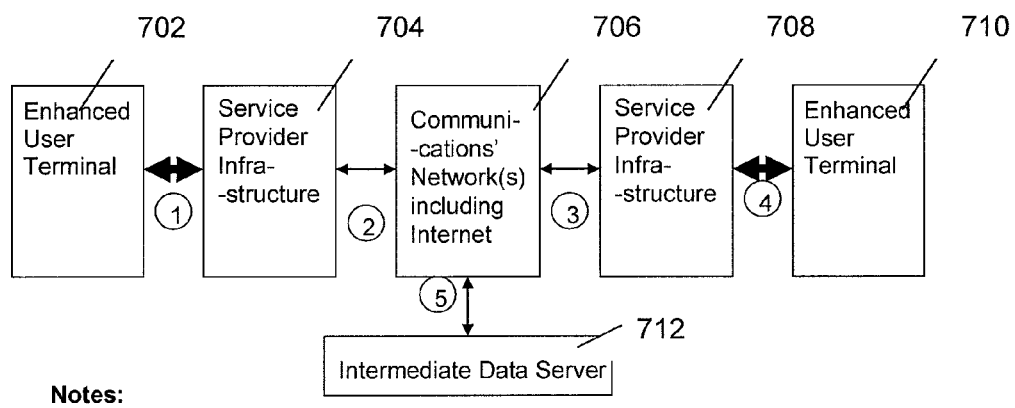

Notes:
1. For Wireless/Mobile Service Provider the Infrastructure includes Base Station Radio Towers etc.
2. The Intermediate Data Server resides on the Internet.
3. The Service Providers for the two User Terminals may or may not be the same.
4. The Links marked with 2, 3, and 5 are usually very high bandwidth links.
5. The Links marked with a thick line are multiple communication links.
6. Here all the Links to each of the User Terminals are provided by the same Service Provider.

Figure 7

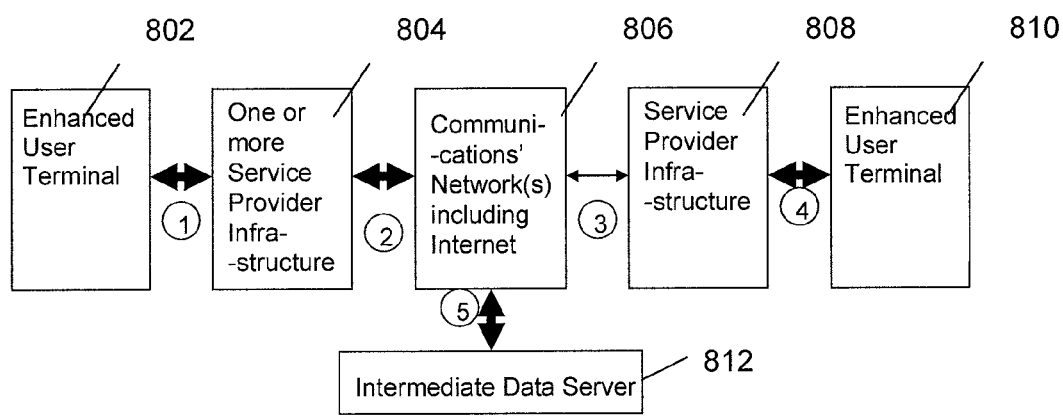

Notes:
1. For Wireless/Mobile Service Provider the Infrastructure includes Base Station Radio Towers etc.
2. The Intermediate Data Server resides on the Internet.
3. The Service Providers for the two User Terminals may or may not be the same.
4. The Links marked with 2, 3, and 5 are usually very high bandwidth links.
5. The Links marked with a thick line are multiple communication links.
6. Here all the Links to the User Terminal on the right are provided by the same Service Provider.

Figure 8

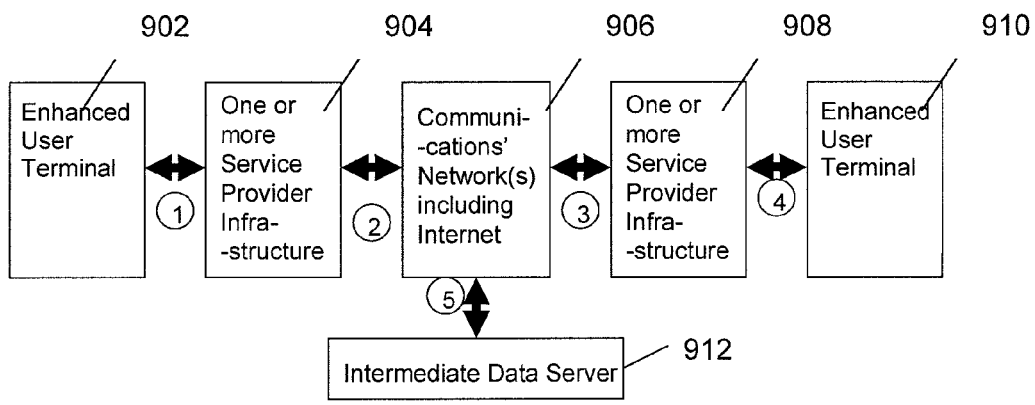

Notes:
1. For Wireless/Mobile Service Provider the Infrastructure includes Base Station Radio Towers etc.
2. The Intermediate Data Server resides on the Internet.
3. The Service Providers for the two User Terminals may or may not be the same.
4. The Links marked with 2, 3, and 5 are usually very high bandwidth links.
5. The Links marked with a thick line are multiple communication links.

Figure 9

Note: One or more of the L Service Providers labeled as Service Provider 1, ..., Service Provider L may be the same Service Provider.

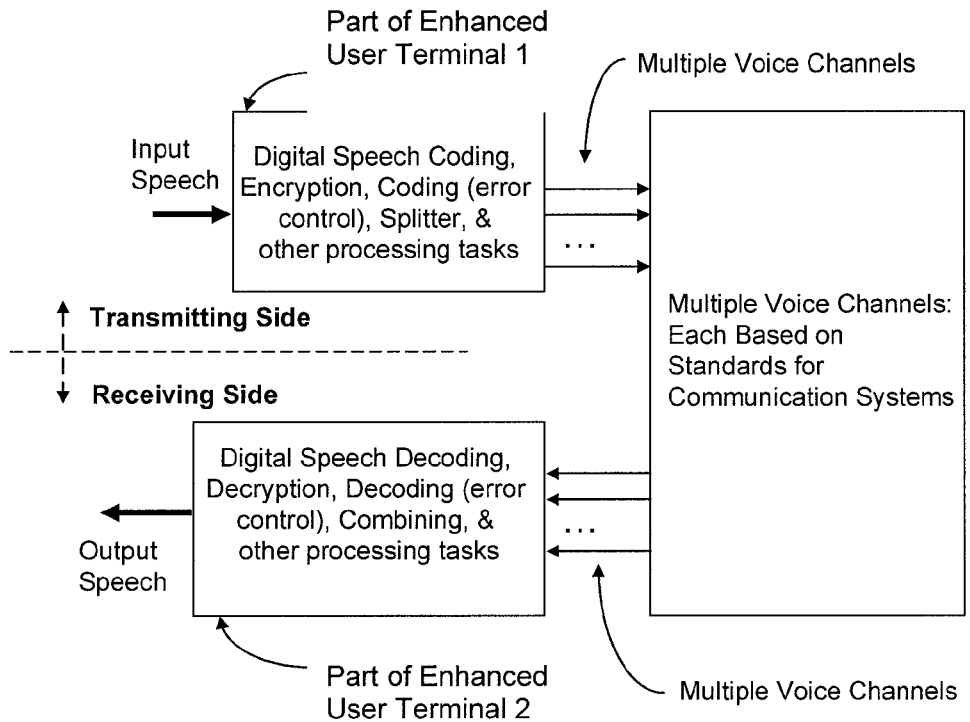

Notes:
1. Each Voice Channel provides communication from the User Terminal to a Service Provider Infrastructure for the Transmitting Side, from that Service Provider Infrastructure of the transmitting User Terminal to a Service Provider Infrastructure of the receiving User Terminal, and from that Service Provider Infrastructure to the User Terminal for the Receiving Side.
2. User Terminal 1 and User Terminal 2 are in communication with each other simultaneously using multiple Voice Channels.
3. The two User Terminals in communication don't have to be of the same type or follow the same Standards. For instance, one can use multiple GSM Voice Channels while the other uses multiple land-line or VoIP Voice Channels.

Figure 18

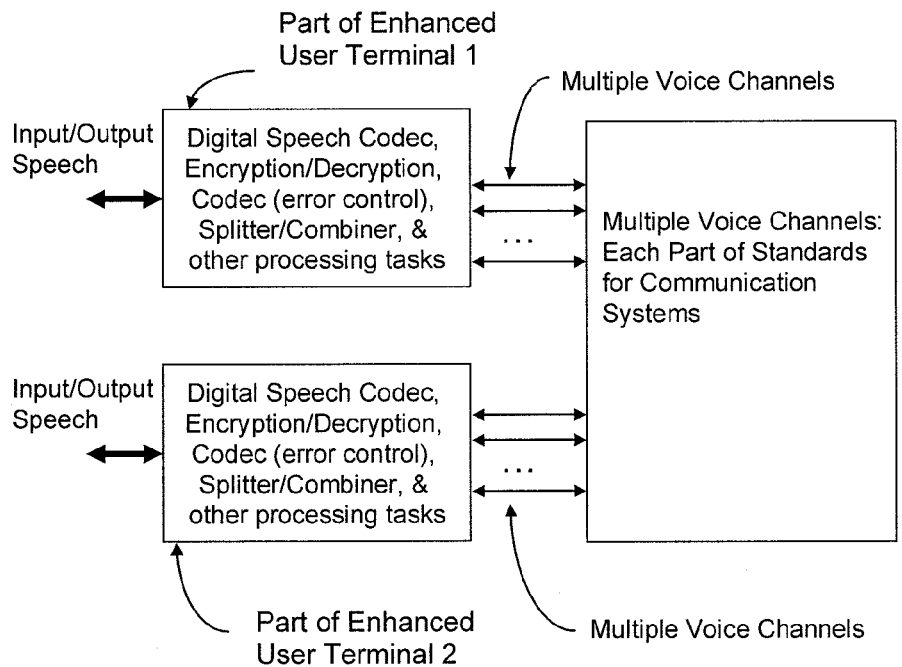

Notes:
1. Each Voice Channel provides communication from the User Terminal to a Service Provider Infrastructure for the Transmitting Side, from that Service Provider Infrastructure of the transmitting User Terminal to a Service Provider Infrastructure of the receiving User Terminal, and from that Service Provider Infrastructure to the User Terminal for the Receiving Side.
2. There are multiple Voice Channels from User Terminal 1 to User Terminal 2 and multiple Voice Channels from User Terminal 2 to User Terminal 1.
3. Digital Speech Codec does the task of Digital Speech Coding and Decoding.
4. User Terminal 1 and User Terminal 2 are in communication with each other simultaneously using multiple Voice Channels.
5. The two User Terminals in communication don't have to be of the same type or follow the same Standards. For instance, one can use multiple GSM Voice Channels while the other uses multiple land-line or VoIP Voice Channels.

Figure 19

Note:
1. Any type of User Terminal can Communicate With Any Other Type of User Terminal.
2. It is possible that the Service Providers for the two User Terminals in communication may not be the same.

Notes:
1. Two or more than two Channels are used for at least one of the multi-media content from the FLO Transmitters to the User Terminal.

Notes:
1. The configuration of the local area network can be dynamic.
2. The multi-media content that each of the User Terminals receive from the Data Serve can also be dynamic accordingly.

Notes:
1. The TV or the PC receive the Mobile TV Channel content via a regular TV Channel delivered via Satellite, Cable or high speed Internet.
2. The user is automatically switched from the Mobile TV Channel to the regular TV Channel as soon as it is detected that the user can receive the Mobile TV Channel as a regular TV Channel.

SYSTEM AND METHOD FOR VOICE AND DATA COMMUNICATION

FIELD OF INVENTION

The present invention relates broadly to a communication system, a method for conducting communication over one or more communication networks, a communication device, and to a computer readable data storage medium having stored thereon computer code means for instructing a computer device to execute a method of conducting communication over one or more communication networks,

BACKGROUND

In tele-communication or simply communication in short, several societal trends are developing. Firstly, tele-communication is going digital. Be it voice communication in the form of telephony, video communication as in video-calling, radio communication via Satellite, or multi-media communication as in TV (Cable, Satellite or mobile) among others, digital tele-communication systems are becoming commonplace. Secondly, almost all tele-communications systems are based on detailed Standards in order to enable and facilitate communication. Legal and regulatory concerns also need to be addressed and complied to. Thirdly, there is an ever increasing demand for new technologies to provide for anytime, anyplace anywhere communication. Fourthly, there is an ever increasing demand for communication systems to perform better in terms of Quality of Service (QoS). This QoS is generally measured in terms of a number of factors including voice quality for voice telephony systems performance of techniques for encoding of information from analog to digital format for voice, images and multi-media data)

security provided to the overall communication speed and reliability of communication for data and multi-media content using Internet, mobile and TV.

Finally, technologies such as LCD and Plasma are and displays based on such technologies are increasing in display sizes and resolution detail.

It is expected that many of these trends will continue and grow with the passage of time. Thus, the demands for increased speeds of data communication are expected to grow. Similarly, the demands for the availability and QoS of all types of communication including voice, data, and multi-media content are also expected to grow. It is also reasonable to expect that there will be a demand for much higher resolution displays that are larger in size than the ones that exist today.

For example, in the realm of voice communication, a Vocoder (voice encoder/decoder) that is accepted for the design of a voice communication system may satisfy certain metrics of performance (voice at the receiving end has to intelligible for instance) may not be sufficient in certain other situations. Consider a military situation where some urgent matters are being discussed over the mobile phone. The importance of the conversation is so high that one may seek a better quality and more secure voice from the current communication system. Also it may not be possible to design a new voice communication system dedicated purely for the military.

Similarly, in the realm of data communication, even though the Standards for Communication Channels and digital data representation are well-established, it is often not possible to use the existing Data Channels for the delivery of digital data especially if one wishes to have real-time or near-real time delivery of multi-media digital content/data. This is due to the size of files involved and the speed of data transfer that existing Channels provide. Often, high-resolution multi-media data is further coded into smaller size files with lower resolution to provide for communication over existing Channels, something that may not be acceptable to some users. As displays get bigger, higher resolution multi-media data should be made available at the User Terminals.

Designing new communication networks, whether for voice or data communications, is a massive challenge and to upgrade an existing one may also be an equally massive challenge. This is due to the costs and complexities involved with setting up of the infrastructure for such networks. This is evidenced by the few, if any, attempts to upgrade the land-line (or fixed) telephone or data networks. Even the evolution of mobile network is rather slow. On the other hand, User terminals are easier to build, change, and upgrade. Therefore, while user terminals may be changed frequently, the user terminals still use the existing communications networks to communicate digital information.

"Real Time Data Transmission Over GSM Voice Channel for Secure Voice and Data Applications," by N N Katugampala, K T A-Naimi, S Villette and A M Kondoz, 13$^{th}$ European Signal Processing Conference EUSIPCO 2005, Turkey, Sep. 4-8, 2005 discusses the use of a Speech Coder which is different than the one used in GSM. Speech is coded at a much lower data rate. Either the coded speech or the data file is then encrypted. A single Voice Channel established using a GSM phone is utilized for transmission of voice and/or data in a secure manner. An Add-on module to the GSM phone is used at the transmitting and receiving ends for carrying out the tasks of speech coding, data encryption etc.

The system, however, suffers from several drawbacks. When used for voice communication, it provides poorer quality voice as the speech is coded using data rates less than the data rates used for voice communication in GSM. When used for data communication, the overall data rate is extremely low making most data intensive applications to either perform at unsatisfactory levels or not perform at all.

Therefore, there exists a need to provide a system and method for voice and data communication to address one or more of the problems mentioned above.

SUMMARY

In accordance with a first aspect of the present invention there is provided a method of conducting communication over one or more communication networks, the method comprising determining a number, A, of simultaneously receivable communication paths at a receiving device; and selecting, based on A, a version of data for reception from a plurality of available versions.

The method may further comprise establishing the A communication paths between a transmitting device and the receiving device; splitting a communication data stream for carrying the selected version of the data into L sub-streams; transmitting the sub-streams via the A communication paths from the first device to the second device; and combining the sub-streams for processing at the receiving device.

The plurality of available versions may comprise a master version and one or more derived versions from the master version.

The master version may comprise a master media file, and the derived versions differ from the master media file in one or more of a group consisting of resolution file format, audio format, video format, image format, color depth, and contrast.

The data may comprise a digitally encoded voice signal, and the plurality of versions comprise differently encoded versions of the voice signal.

The plurality of versions may include different encryption of the data.

The encrypting may be performed before the splitting step.

The encrypting may be performed after the splitting step.

The plurality of versions may include different encoding of the data.

The encoding may be performed before the splitting step.

The encoding may be performed after the splitting step.

Determining A may comprise a hand shake between the receiving and the transmitting devices.

The hand shake may comprise user input at the receiving, transmitting or both devices.

The transmitting device may receive the selected version of the data from a source device.

The source device may be connected to the transmitting device via a high capacity link.

The receiving device may transmit the combined sub-streams to a destination device.

The destination device may be connected to the receiving device via a high capacity link.

The communication paths may comprise one of a group consisting of CDMA, GSM, 3G, UMTS, WI-FI, and WiMAX, LAN, cable, DSL, ADSL, Dial-up and UWB.

The communication paths may be provided by one or more service providers.

The plurality of versions may be provided by coding the data into B data streams at a transmitting device; transmitting the data streams over B respective communication paths; wherein one of the data streams is capable of being decoded into a first version of the data; and wherein other ones of the data streams, in combination with said one data stream, are capable of being decoded into additional versions of the data.

The method may further comprise decoding the data streams simultaneously received on the A communication paths into the selected version of the data.

In accordance with a second aspect of the present invention there is provided a communication device comprising means for determining a number, A, of simultaneously receivable communication path at a receiving device; and means for selecting, based on A, a version of data for reception from a plurality of available versions.

The communication device may further comprise means for establishing the A communication paths between said communication device and a transmitting device; means for splitting a communication data stream for carrying the selected version of the data into A sub-streams; means for combining the sub-streams received via the A communication paths from said transmitting device.

In accordance with a third aspect of the present invention there is provided a communication device comprising means for coding data into B data streams; means for transmitting the data streams over B respective communication paths; wherein one of the data streams is capable of being decoded into a first version of the data; and wherein other ones of the data streams, in combination with said one data stream, are capable of being decoded into additional versions of the data.

In accordance with a fourth aspect of the present invention there is provided a communication system for conducting communication over one or more communication networks, the system comprising means for determining a number, A, of simultaneously receivable communication paths at a receiving device; means for selecting, based on A, a version of data for reception from a plurality of available versions.

The communication system may further comprising means for establishing the A communication paths between the receiving and a transmitting devices; means for splitting a communication data stream for carrying the selected version of the data into A sub-streams; means for transmitting the sub-streams via the A communication paths from the transmitting device to the receiving device; and means for combining the sub-streams for processing at the receiving device.

The communication system may further comprise means for coding the data into B data streams at a transmitting device; means for transmitting the data streams over B respective communication paths; wherein one of the data streams is capable of being decoded into a first version of data; and wherein other ones of the data streams, in combination with said one data stream, are capable of being decoded into additional versions of the data.

The communication system may further comprise means for decoding the data streams simultaneously received on the A communication path into the selected version of the data.

In accordance with a fifth aspect of the present invention there is provided a computer readable data storage medium having stored thereon computer code means for instructing a computer device to execute a method of conducting communication over one or more communication networks, the method comprising determining a number, A, of simultaneously receivable communication paths at a receiving device; and selecting, based on A, a version of data for reception from a plurality of available versions.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 5 shows a simplified block diagram illustrating a communication system according to an example embodiment.

FIG. 7 shows a simplified block diagram illustrating a communication system according to an example embodiment.

FIG. 8 shows a simplified block diagram illustrating a communication system according to an example embodiment.

FIG. 9 shows a simplified block diagram illustrating a communication system according to an example embodiment.

FIG. 18 shows a schematic block diagram illustrating multiple voice channel communication between two user terminals, according to an example embodiment.

FIG. 19 shows a schematic block diagram illustrating multiple voice channel communication between two user terminals, according to an example embodiment.

DETAILED DESCRIPTION

Figure 1:
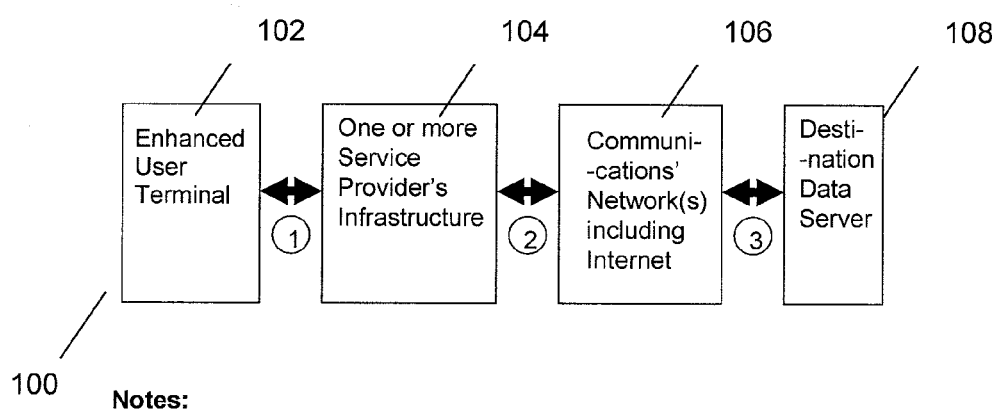
FIG. 1 shows a simplified block diagram illustrating a communication system according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "encoding", "decoding", "splitting", "combining", "selecting", "recovering" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Figure 26:
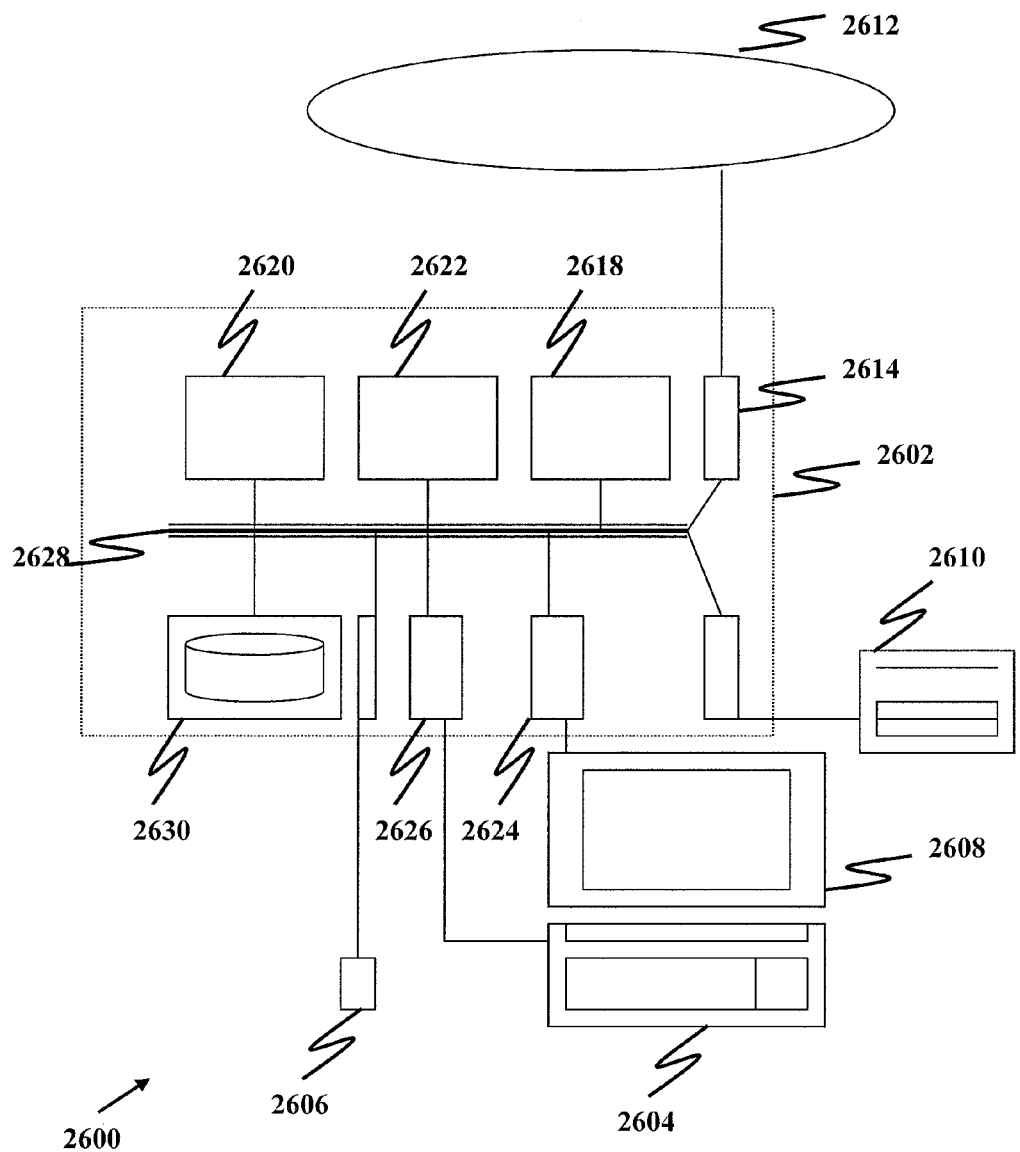
FIG. 26 shows a schematic block diagram of a computer system for implementing the system, device, method according to example embodiments.

The method and system of the example embodiment can be implemented on a computer system 2600, schematically shown in FIG. 26. It may be implemented as software, such as a computer program being executed within the computer system 2600, and instructing the computer system 2600 to conduct the method of the example embodiment.

The computer system 2600 comprises a computer module 2602, input modules such as a keyboard 2604 and mouse 2606 and a plurality of output devices such as a display 2608, and printer 2610.

The computer module 2602 is connected to a computer network 2612 via a suitable transceiver device 2614, to enable access to e.g. the Internet or other network systems such as Local Area Network (LAN) or Wide Area Network (WAN).

The computer module 2602 in the example includes a processor 2618, a Random Access Memory (RAM) 2620 and a Read Only Memory (ROM) 2622. The computer module 2602 also includes a number of Input/Output (I/O) interfaces, for example I/O interface 2624 to the display 2608, and I/O interface 2626 to the keyboard 2604.

The components of the computer module 2602 typically communicate via an interconnected bus 2628 and in a manner known to the person skilled in the relevant art.

The application program is typically supplied to the user of the computer system 2600 encoded on a data storage medium such as a CD-ROM or flash memory carrier and read utilising a corresponding data storage medium drive of a data storage device 2630. The application program is read and controlled in its execution by the processor 2618. Intermediate storage of program data maybe accomplished using RAM 2620.

Figure 27:
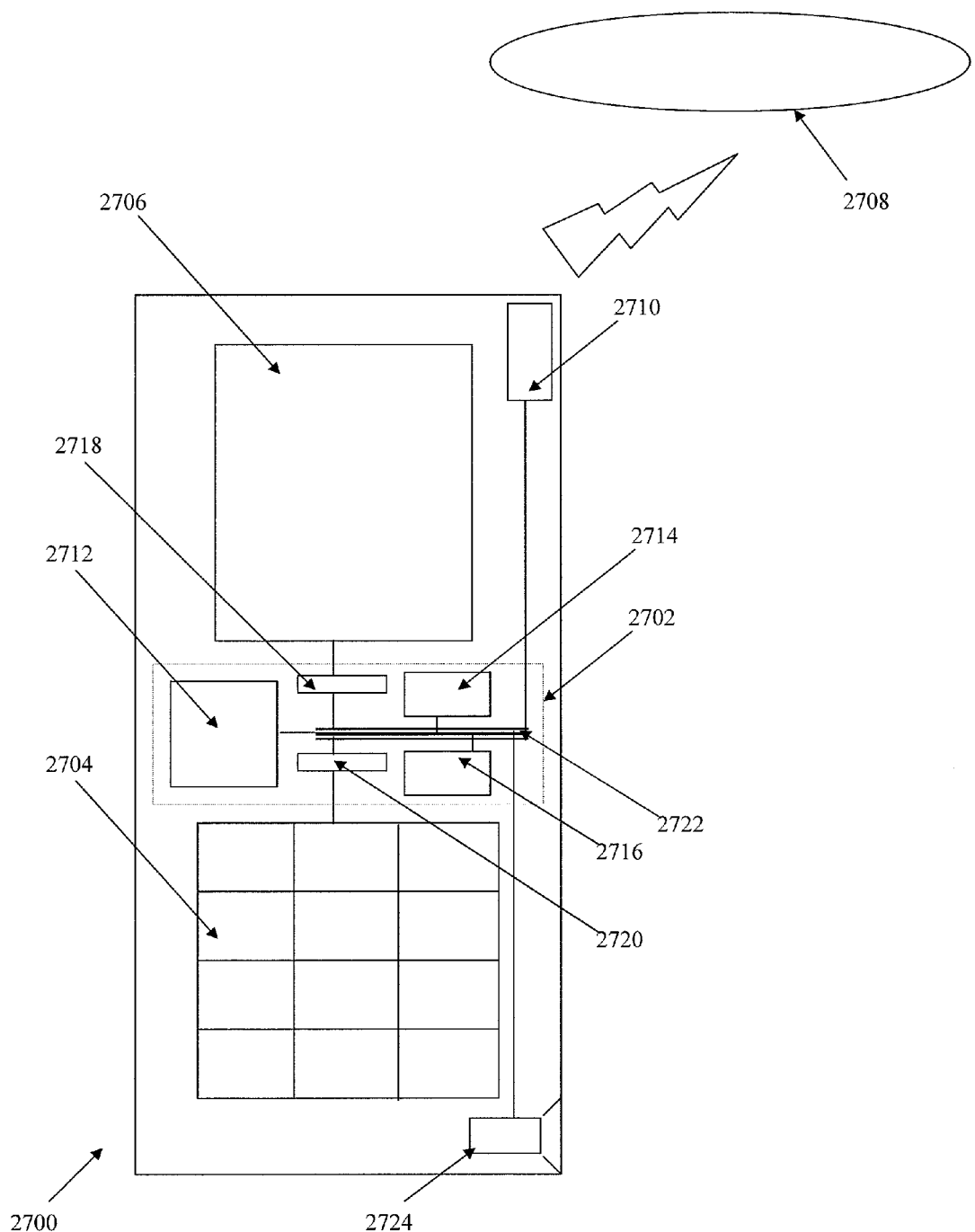
FIG. 27 is a schematic block diagram illustrating a wireless device for implementing example embodiments.

The method of the current arrangement can be implemented on a wireless device 2700, schematically shown in FIG. 27. It may be implemented as software, such as a computer program being executed within the wireless device 2700, and instructing the wireless device 2700 to conduct the method.

The wireless device 2700 comprises a processor module 2702, an input module such as a keypad 2704 and an output module such as a display 2706.

The processor module 2702 is connected to a wireless network 2708 via a suitable transceiver device 2710, to enable wireless communication and/or access to e.g. the Internet or other network systems such as Local Area Network (LAN), Wireless Personal Area Network (WPAN) or Wide Area Network (WAN).

The processor module 2702 in the example includes a processor 2712, a Random Access Memory (RAM) 2714 and a Read Only Memory (ROM) 2716. The processor module 2702 also includes a number of Input/Output (I/O) interfaces, for example I/O interface 2718 to the display 2706, and I/O interface 2720 to the keypad 2704.

The components of the processor module 2702 typically communicate via an interconnected bus 2722 and in a manner known to the person skilled in the relevant art.

The application program is typically supplied to the user of the wireless device 2700 encoded on a data storage medium such as a flash memory module or memory card/stick and read utilising a corresponding memory reader-writer of a data storage device 2724. The application program is read and controlled in its execution by the processor 2712. Intermediate storage of program data may be accomplished using RAM 2714.

FIG. 1 shows a simplified block diagram of Embodiment #1 of a data communication system for communication between an Enhanced User Terminal and a Data Server. In the embodiment, the Enhanced User Terminal 102 is seeking a particular file to be sent from a Data Server 102. The communication between the Enhanced User Terminal 102 and a Data Server 108 is carried out in the following manner:

1. The Enhanced User Terminal 102 establishes a contact with a Data Server 108 and sends a request to the Data Server 108 for data to be transmitted using L available Data Channels on the Enhanced User Terminal.
2. The request also includes instructions for the Data Server 108 to send a version of the data that better utilizes the bandwidth provided by the L available data channels. For example, suppose the Data Server 108 normally sends, to a typical one channel User Terminal, a version of the data with file-size X. With e.g. three available channels on an Enhanced User Terminal, the Data Server is instructed to send another version of the data with a file-size three times the size of X. This may represent a version of the same data with better quality encoding or security encryption.
3. The Data Server 108 encodes and extracts the data into a version as per the Enhanced User Terminal 102 request.
4. A Splitter in the Data Server 108 splits the data file into sub-files as per the Enhanced User Terminal 102 request (or in some pre-selected manner). The splitting may also be done as the file transfer progresses on a packet-by-packet basis.
5. The Enhanced User Terminal 102 establishes L communication links with the Data Server 108 using the Infrastructure of one or more Service Providers 104. The sub-files are transferred simultaneously from the Data Server 108 to the Enhanced User Terminal 102 over the L communication links.
6. The Enhanced User Terminal 102 simultaneously receives the multiple files and then uses a combiner to re-construct the data. The Combiner may also begin to re-construct the original file from the received partial sub-files from multiple links without waiting for the complete sub-files to be received.

In the above described embodiment for the data communication 100, the Data Server 108 and the Enhanced User Terminal 102 take additional steps (such as selection of appropriate file, splitting/combining, set up multiple links, simultaneously transmitting/receiving on multiple links etc) that are not present in data transfers based on a single Data Channel.

Figure 2:
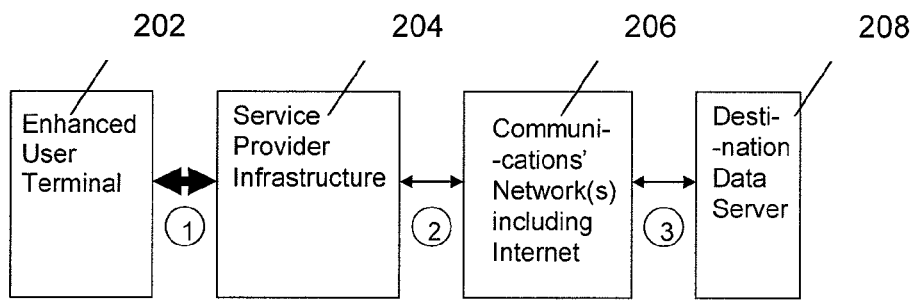
FIG. 2 shows a simplified block diagram illustrating a communication system according to an example embodiment.
Figure 3:
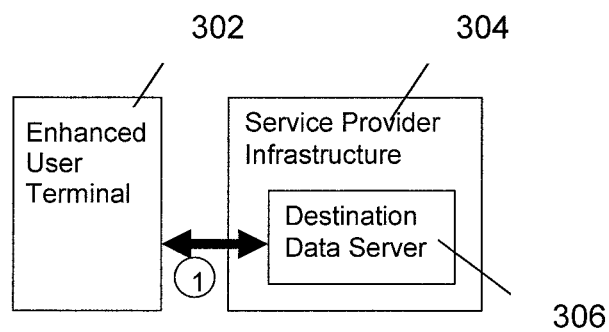
FIG. 3 shows a simplified block diagram illustrating a communication system according to an example embodiment.

FIGS. 2 and 3 show simplified block diagrams of Embodiments #2A and #2B of data communication systems for communication between an Enhanced User Terminal and a Data Server.

A single Service Provider may provide all the communication links to the User Terminal 202/302, and carry out the tasks of data splitting/combining, data transfer etc. In such a case, it is the Service Provider Infrastructure 204/304 that provides all the additional functionalities and as far as any entity beyond the Service Provider Infrastructure 204/304 is concerned, the Enhanced User Terminal 202/302 is seen to have a single, high bandwidth, communication link. As illustrated in FIG. 3 (Embodiment #2B), the Data Server 308 may be a part of the Service Provider Infrastructure 304.

Alternatively, as illustrated in FIG. 2 (Embodiment #2A), the Data Server 208 may reside beyond the Service Provider Infrastructure 204. In this embodiment, the Data Server 208 communicates with the User Terminal 202 via the Service Provider Infrastructure 204 over the Internet 206. The communication between the Data Server 208 and the Service Provider Infrastructure 204 is as usual over a high capacity communications link.

Figure 4:
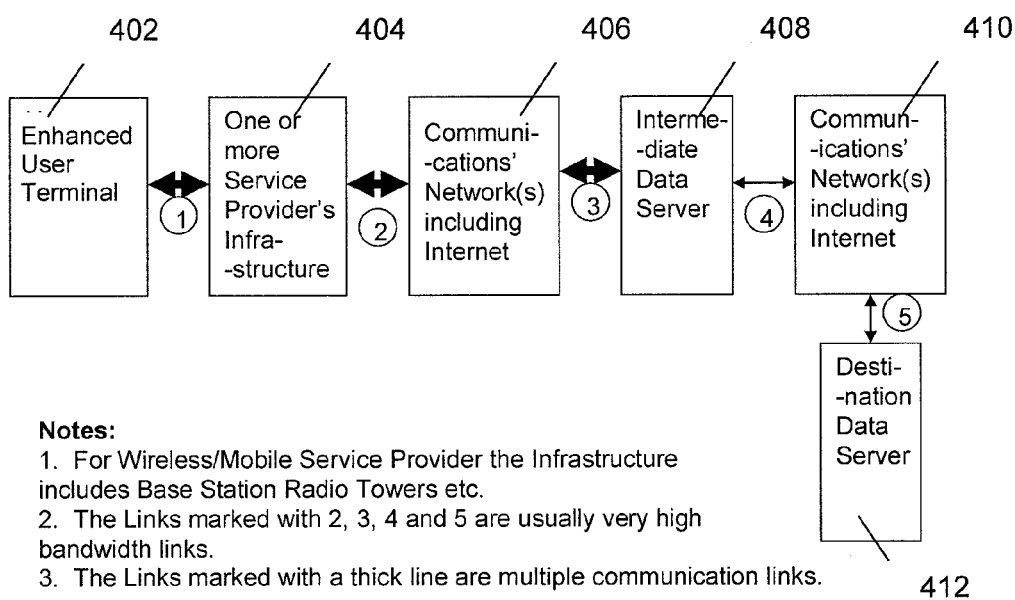
FIG. 4 shows a simplified block diagram illustrating a communication system according to an example embodiment.

The Service Providers' Infrastructures may not wish to be utilized by the User Terminal to contact any server on the Internet beyond the Service Provider Infrastructure. Similarly, a Data Server may also not perform certain additional tasks. In such scenarios, an Intermediate Server (IS) can be used to provide communication between User Terminals on one side and Data Server on the other. The Data Server is termed Destination Data Server to draw distinction between a Data Server and an Intermediate Server. FIG. 4 shows a simplified block diagram of Embodiment #3 of a data communication system for communication between an Enhanced User Terminal 402 and a Data Server 412 via an Intermediate Server 408.

An IS (Intermediate Server) 408 and an Enhanced User Terminal 402 communicate via multiple links provided by one or more Service Providers' Infrastructures 404. The IS 408 carries out the tasks of data splitting/combining, data transfer etc. In this embodiment, it is the IS 408 that provides all the additional functionalities and as far as any entity beyond the IS 408 is concerned, the Enhanced User Terminal 402 appears to have a single communication link capable of much larger data rates. The Destination Data Server 412 resides beyond the Service Provider Infrastructure 404 and communicates with the IS 408 over the Internet 410 over a high capacity communications link.

FIGS. 5 to 9 show simplified block diagrams of Embodiments #4A-E of data communication systems for communication between an Enhanced User Terminal and another Enhanced User Terminal. One immediate application of this communication system is in improving the quality of multimedia communication for video-calling and conferencing. Using the three embodiments numbered #1-#3 earlier as basis; the embodiments for data communication between two User Terminals can be described as follows:

Embodiment #4A (FIG. 5). This is similar to Embodiment #2A (FIG. 2) where the single Service Provider 504 and the Enhanced User Terminals 502 carry out the tasks of data splitting/combining, data transfer etc., while providing the communications' links to each of the Enhanced User Terminals 502.

Figure 6:
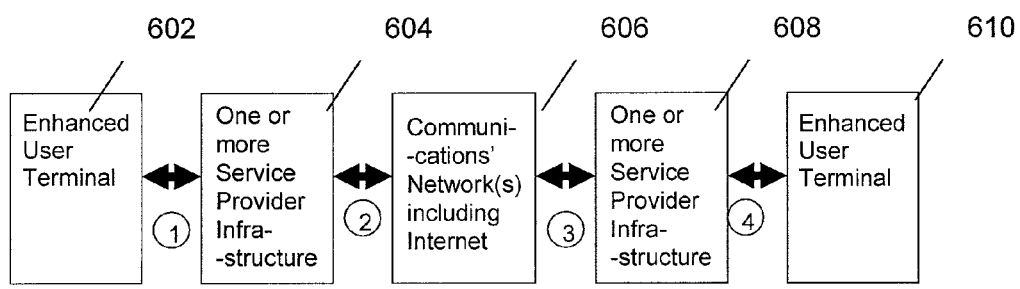
FIG. 6 shows a simplified block diagram illustrating a communication system according to an example embodiment.

Embodiment #4B (FIG. 6). This is similar to Embodiment #1 (FIG. 1), but there is an Enhanced User Terminal 3810 at the other end. In this embodiment for the data communication system, only the two Enhanced User Terminals 602 and 610 take additional steps such as selection of appropriate file, splitting/combining, set up multiple links, simultaneously transmitting/receiving on multiple links etc.

Embodiment #4C (FIG. 7). This is similar to Embodiment #4A in FIG. 5 except that an Intermediate Data Server (IS) 712 is utilized to facilitate overall communication. Such an IS 712 may assist in managing electronic addresses for the Enhanced User Terminals 702, 710 outside of their respective Service Provider Infrastructures 704, 708 and overall data transfer. The intermediate data server (IS) 712 is used to establish communication channels/paths between two servers/devices, here Terminals 702, 710, that cannot communicate directly with each other as they don't know each other's address. These addresses may also change (due to the settings of the Internet Service Providers (ISP) that provide Internet access to these servers/devices that may change) from one session on the Internet to the next. Once the connection between two Terminals 702, 708 is made using the IS 712, the flow of actual info (data packets) may or may not flow thru the IS 712 depending on the applications.

Embodiment #4D (FIG. 8). In this embodiment, the Enhanced User Terminal 802 communicates with the IS 812 much the same way as the Enhanced User Terminal 102 (FIG. 1) communicates with the Destination Data Server 108 in Embodiment #1 (FIG. 1). The Enhanced User Terminal 810 communicates with the IS 812 much the same way as the User Enhanced Terminal 202 communicates with the Destination Data Server 208 in Embodiment #2A (FIG. 2).

Embodiment #4E (FIG. 9). This is similar to Embodiment #4B in FIG. 6 except that an Intermediate Data Server (IS) 912 is utilized to facilitate overall communication between the two Enhanced User Terminals 902/910. Such an IS 912 may assist in managing electronic addresses for the Enhanced User Terminals 902/910 outside of their respective Service Providers' Infrastructures 906 and 908 and overall data transfer.

It will be understood by a person skilled in the art from the context whether the Data Server in the described embodiments is a Destination Data Server or an Intermediate Data Server.

The Enhanced User Terminals e.g. 402 (FIG. 4) of the example embodiments can set up multiple links, split/combine the data files into sub-files, and communicate the sub-files over the multiple links. Similarly the Destination/Intermediate Servers e.g. 408/412 are able to do the same for the data files. For example, in the case of a media file, a high-resolution master copy of the data file is stored at the Destination Data Server e.g. 412 or the Enhanced User Terminal e.g. 402. These Data Servers/Enhanced User Terminals e.g. 412/402 may either create lower resolution data files according to the request, or have all the other versions stored in anticipation of all possible requests. The recipients are able to construct the transmitted version of the data file from the received sub-files. The Enhanced User Terminals e.g. 402 and the Servers e.g. 408, 412 may also incorporate additional functionalities such as encryption/decryption, encoding/decoding (for error control) and so on to further improve the quality of service for the overall communication process for a data file. The versions could differ from the master media file in one or more of image resolution, image file format, audio format, video format, image format, colour depth, contrast, etc.

Figure 10:
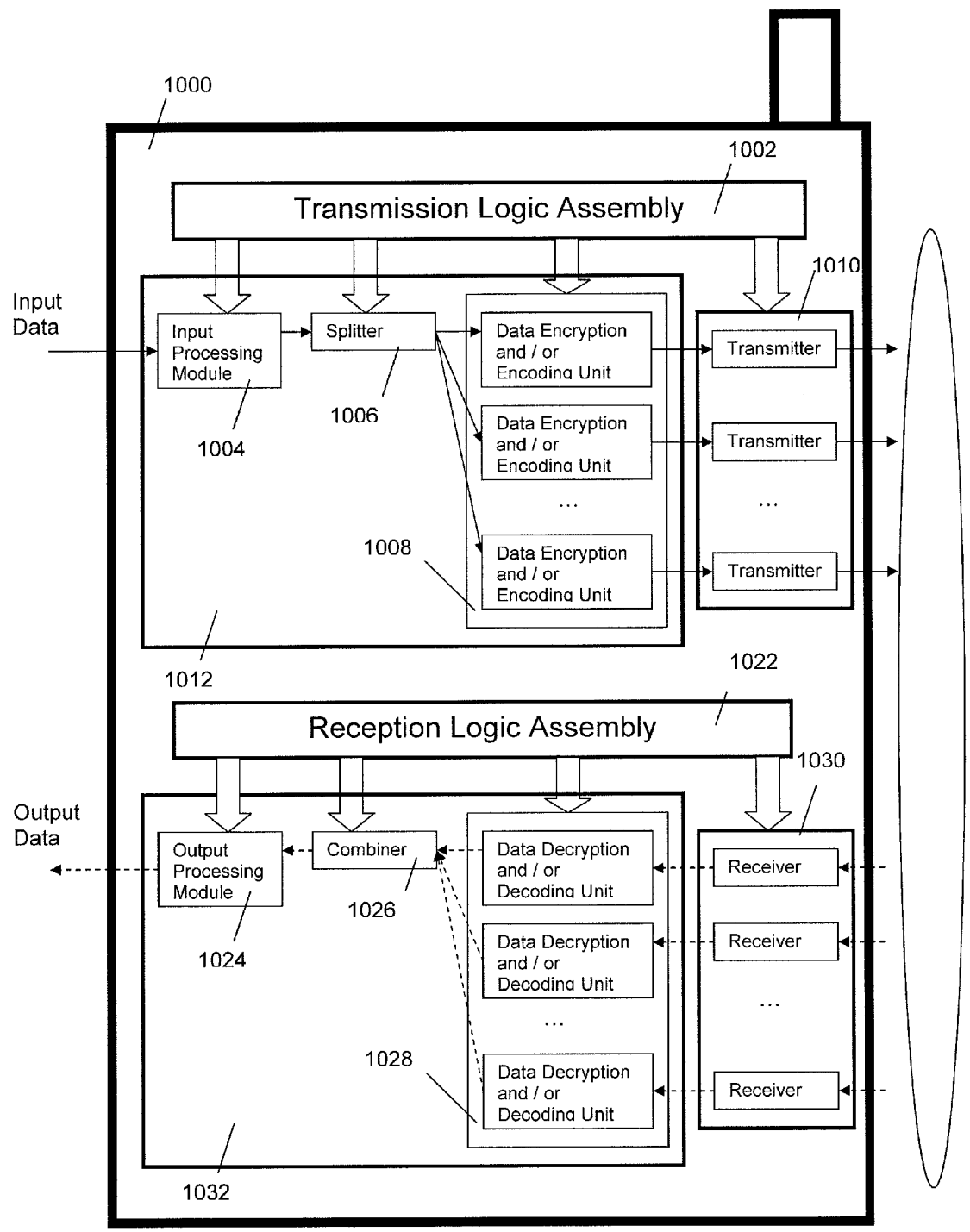
FIG. 10 shows a schematic block diagram of a user terminal according to an example embodiment.

A block diagram for the Enhanced User Terminal 1000 of the example embodiments as used in the data communication is shown in FIG. 10. When an Enhanced User Terminal 1000 receives a request from e.g. another Enhanced User Terminal to transmit data, the Transmission Logic Assembly 1002 determines the number of channels, L, available for transmission. A version of the data to be transmitted is then selected and extracted accordingly by the Input Processing Module 1004. Thereafter, the version of the data to be transmitted is sent to the Splitter 1006 for splitting into the L number of data streams. Each data stream is sent to respective Data Encryption/Encoding units of the Data Encryption/Encoding Module 1008. It will also be appreciated that versions of the data may also be created at the Data Encryption/Encoding block 1008, with different encryption and/or encoding algorithms. Finally, the encrypted/encoded data streams are sent to respective transmitters of the Transmitter Module 1010 for transmission. Collectively, the Input Processing Module 1004, Splitter 1006 and Data Encryption/Encoding Module 1008, may be termed the Transmission Data Processor 1012. Each of the Input Processing Module 1004, Splitter 1006, Data Encryption/Encoding Module 1008 and Transmitter Module 1010, is controlled by the Transmission Logic Assembly 1002 which also performs the necessary handshaking with the receiving device, e.g. another Enhanced User Terminal.

Reversely, should the Enhanced User Terminal 1000 be receiving M number of data streams, the M data streams are first received by respective Receivers of the Receiver Module 1030. The Data streams are then decrypted and/or decoded by respective data decryption/decoding units of the Data Decryption/Decoding Module 1028. The decrypted/decoded data streams are then reconstructed by a Combiner 1026. Finally, the reconstructed (combined) received data is processed by the Output Processing Module 1024 for output to the User, in the form of e.g. video or audio signals. Collectively, the Output Processing Module 1024, Combiner 1026 and the Data Decryption/Decoding Module 1028, may be termed the Reception Data Processor 1032. Each of the Output Processing Module 1004, Combiner 1006, Data Decryption/Decoding Module 1008 and Receiver Module 1010, is controlled by the Reception Logic Assembly 1022 which also performs the necessary handshaking with the transmitting device, e.g. another Enhanced User Terminal.

It will be appreciated by a person skilled in the art that the Transmitter Module 1010 and Receiver Modules 1030 may be combined to form a single Transceiver Module comprising a plurality of Transceiver Units, each unit capable of transceiving on its own communication channel. Further, in a modification of the Enhanced User Terminal 1000, the Splitter 1006 may follow Data Encryption/Encoding Module 1008 instead of preceding it. In such an embodiment, the Data Encryption/Encoding Module 1008 may then comprise one data encryption/encoding unit. Similarly, the Combiner 1006 may follow Data Decryption/Decoding Module 1028 instead of preceding it and in such an embodiment, the Data Decryption/Decoding Module 1028 may then comprise one decryption/decoding unit.

Figure 11:
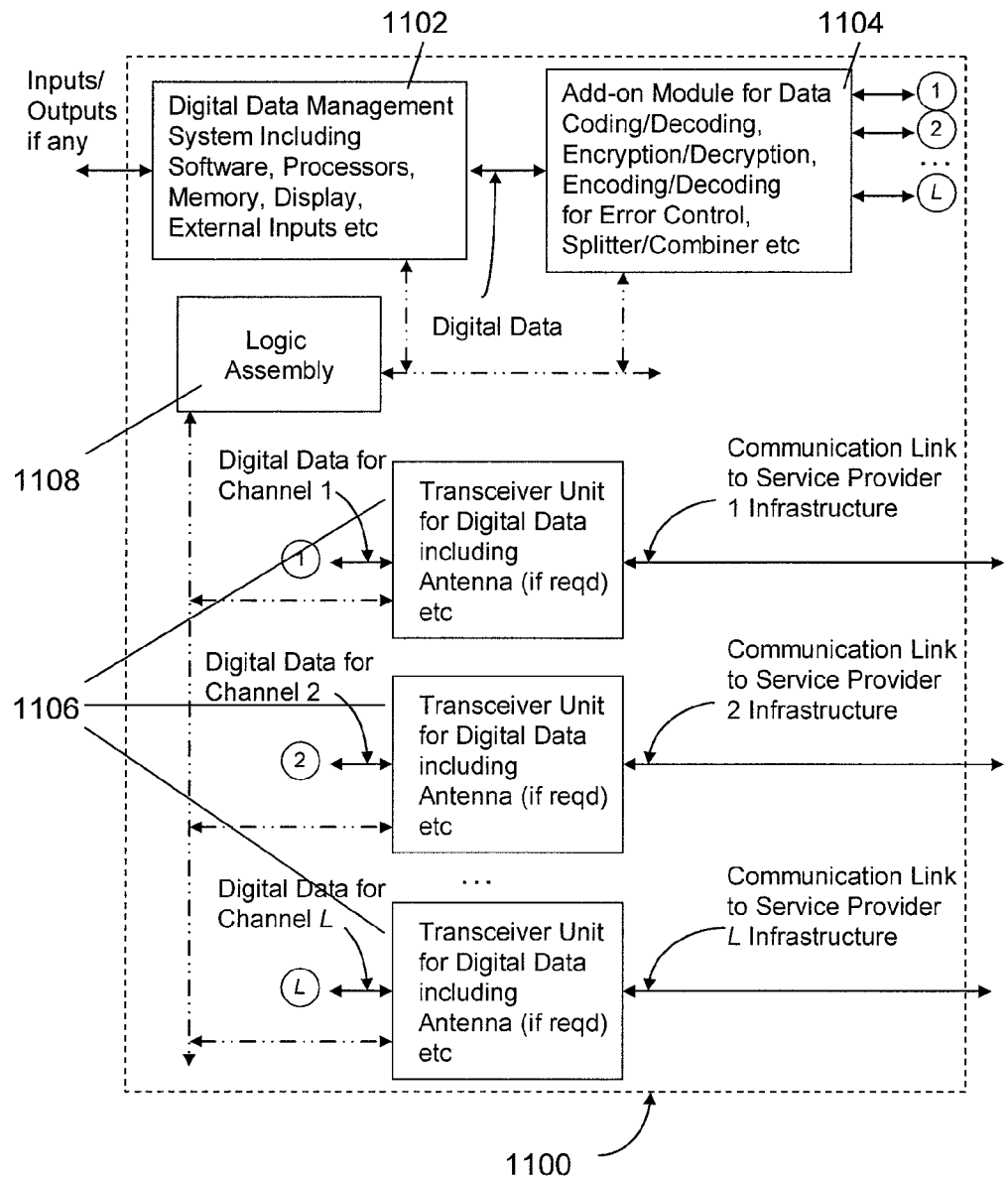
FIG. 11 shows a schematic block diagram of a user terminal according to an example embodiment.

FIG. 11 illustrates another embodiment of the Enhanced User Terminal 1100 for Data Communications. In this embodiment, the Digital Management System 1102 combines the input and output processing modules into a single interface for processing forms of input into digital data when transmitting and processing digital data into output format when receiving. The Encryption/Encoding, Decryption/Decoding, Splitter, Combiner Modules are all housed in an Add-on Module 1104, while the transmitter and receiver units have been combined to form transceiver units 1106, each transceiver unit providing communications link to a service provider infrastructure. A combined logic assembly 1108 controls the functions of the various modules, e.g. Add-on Module 1104, Digital Data Management System 1102, transceiver unit 1106 etc.

FIG. 11 illustrates a maximum number of L Channels that can exist in the Transmitter or Receiver at any time. The actual number of Channels used depends on a number of factors such as user settings (cost may be one consideration), preferences, system performance required, and so on. In other words, a User may choose to use transmit or receive on less than L channels. The selection of number and type of Channels to be used and other parameters required for the various modules e.g. Add-on Module 1104 etc., are provided by the Logic Assembly 1108.

Each of the transceiver units 1106 are connected to a communication link. Each of these communication links adheres to Standards such as 3G, WI-FI, WiMAX, IP, VoIP and so on. If all the communication links are of the same type (all 3G for instance) then the Enhanced User Terminal 1100 consists of L identical Transceiver Units of the same type. For a 3G Standards based Enhanced User Terminal, each Transceiver Unit is the same as one that uses one USIM card.

The Logic Assembly 1108 also co-ordinates functions and communication of logic/control signals between the Enhanced User Terminal, the Service Providers' Infrastructures, Communications' Networks including Internet, and the Data Server/User Terminal.

The Enhanced User Terminal of the example embodiment has a maximum of L Channels. Two Enhanced User Terminals in data communication can be of completely different types. Therefore if two Enhanced User Terminals, say Enhanced User Terminal 1 and Enhanced User Terminal 2, are in communication, the number and type of Channels for Enhanced User Terminal 1 and Enhanced User Terminal 2 can be of completely different nature. These Channels follow the respective Standards and well-known data communication protocols. For a mobile Standards based Enhanced User Terminal, this is accomplished by L circuits of the respective mobile system (CDMA, GSM, 3G, UMTS etc). For a wireless Standards based User Terminal, this is accomplished by having circuits for L wireless Channels. For the land-line based User Terminal, this is accomplished by L land-lines (one Channel per land-line). For the PC/VoIP systems, this is accomplished by using L simultaneous Data Channels based on IP communications' protocol. This may also include Data Channels of the type provided and managed by MSN, YAHOO, SKYPE, for instance.

In some embodiments, the transmitted data does not have to be completely received before it is output. For example, a data file may be displayed or managed in a Enhanced User Terminal in the form of an enhanced 3G phone even when it has only partially received the data file. The Data Server may take that into account when splitting the extracted data file and sending the two sub-files. For instance, for a video the two sub-files may be split and sent in a manner that the data for the first frame is sent over the two 3G Data Channels to the Enhanced User Terminal before the data for the second frame is sent over to the Enhanced User Terminal. Thus, the Enhanced User Terminal will be able to construct and display the first frame (and all other frames as well) in a chronological order at the earliest opportunity.

In the example embodiments, the Splitter may split the extended data file into two sub-files in a static (before communication begins) or in a dynamic manner (as communication proceeds). The Splitter may also create packets from the extracted data file directly and then transmit them over the two channels in a manner as decided by the Data Server and Enhanced User Terminal.

The Enhanced User Terminal may also incorporate additional functions such as coding/decoding for error control, encryption/decryption for security, and so on. This can be done in an adaptive manner depending on the channel conditions, performance level required, and other user based factors.

The Enhanced User Terminal does not have to use all its Data Channels at all times. An Enhanced User Terminal with L mobile Data Channels may use any number of Data Channels from 1 to L at any time. The particular Data Channels (number as well as selection of which Data Channels from the total of L Data Channels) to be used for a particular data communication becomes a function of user settings (cost may be one consideration), preferences, system performance required, and so on. The selection of Data Channels may also be changed during a data communication.

It is understood to those skilled in the art that a wireless/mobile technologies' based Enhanced User Terminals can have one or more of different types of wireless/mobile Data Channels such as GSM, 3G, CDMA, WI-FI, and WiMAX to name a few. An Enhanced User Terminal may also have a mixture of wireless and wired Channels.

For example, an Enhanced User Terminal may also consist of a total of L mobile Data Channels of which J channels are based on GPRS mobile Standard while the remaining K (K=L−J) channels are based on 3G mobile Standard. An Enhanced User Terminal with L mobile Data Channels may use any number of Channels from 1 to L at any time. The particular Data Channels (number, type whether GPRS or 3G, as well as selection of that many Channels from the available J GSM and K 3G channels) to be used for a particular data communication becomes a function of user settings (cost may be one consideration), preferences, system performance required, etc.

If there are multiple choices possible for extracting data file of a given size, the Enhanced User Terminal may also instruct the Data Server of its own choice for the same. Instances of such choices include size of the frames (number of pixels per frame), number of frames per second, number of bits used per pixel, and so on. The Data Server may also offer a menu of choices for the Enhanced User Terminal to choose from. The Enhanced User Terminal settings/choices may also be pre-configured and known to the Data Server a priori.

In the embodiments, it is described mainly of an Enhanced User Terminal using the multiple Data Channels to have the Data Server send over a larger size file as compared to the size of the file sent to an Typical User Terminal with only one Data Channel (and hence a higher resolution file). It will be appreciated by a person skilled in the art that a user may decide to choose to have the smaller sized file sent over in less time. For instance, an Enhanced User Terminal with L 3G Data Channels may request the Data Server to send over a data file that is A times the size of the file sent to a typical User Terminal (and hence provide higher resolution) and use B 3G Data Channels to send it. B is less than or equal to L. If a file sent to a typical one channel User Terminal takes T seconds to receive, the corresponding file sent to the Enhanced User Terminal now will take (A×T)/B seconds as there is A times as much data to be sent over for higher resolution but there is a total of B Data Channels available to do it. Hence as long as A is less than B, the time taken by a Enhanced User Terminal to download a higher resolution file is less than the time it takes a typical User Terminal to download a lower resolution file. If A is equal to B, then the times are equal but the resolution of the file received at the Enhanced User Terminal is higher.

In the embodiments of the present invention, there is provided a system and a method to provide for superior performance as measured in terms of higher resolution of digital data (specially for multi-media applications) from any existing and future networks for data communication. In certain embodiments, the Communication Network(s) need not undergo any upgrades, changes or modifications. In other embodiments, the Communication Network(s) needs to undergo minimal upgrades, changes or modifications. In these other embodiments, the configuration of the individual Data Channel and the wireless radio interface (if any) between the User Terminal (mobile phone in this instance) and the mobile Service Provider Infrastructure remain unchanged. The same applies to the Data Channel and the Communication Network(s) (other than a mobile Service Provider) when they are used for data communication. The User Terminals are re-designed into the Enhanced User Terminals as described here in order to have superior performance. This superior performance is measured in terms of
 (i) Quality of digital data (higher resolution for multimedia files) at the User Terminal;
 (ii) Other important aspects such as cost, availability, security and so on.

Application in Voice Communication

The embodiments of the present invention may be similarly applied to Voice Communication systems, where Enhanced User Terminals could be in the form of enhanced GSM handsets, and the Data Channels are the Voice Channels of the Voice Communication system. In these embodiments, the configuration of the Voice Channel and the interface between the User Terminal (mobile phone in this instance) and the mobile Service Provider Infrastructure remain unchanged. This is similarly applied to the Voice Channel and Communications' Network(s) of other forms of communications other than the mobile Service Provider Infrastructure. The Enhanced User Terminals used in Voice Communication may then have superior performance can be measured in terms of
 (i) Quality of Voice at the receiving end;
 (ii) Other important aspects such as cost, availability, security, etc. voice at the receiving end;

In these embodiments, improved QoS for communication of voice, data, and multi-media information may then be provided by using Communication Systems and Networks that include mobile, wireless, wired, Satellite, Cable, and Internet.

The embodiments utilizes one or more existing Service Provider Infrastructure(s) and Communications' Network(s) and one or more than one Voice Channels on each of these to provide for the superior performance. This is illustrated with the example of a GSM Communications' Network. Typically, a GSM mobile phone has one Subscriber Identity Module (SIM) card that provides for one Voice Channel on a GSM Communications Network. The Vocoder for GSM is a well established one and all GSM phones carry the same Vocoder. It is assumed, for example, that the GSM Vocoder is such that one GSM Voice Channel at a data rate of $R_{GSM}$ bits per second (bps). Typically, $R_{GSM}$ is 13 kbps. Combining multiple such GSM phones, a resulting Enhanced User Terminal, termed Super GSM Phone or SGP in short is created. Such a SGP uses a different Vocoder than the Vocoder of a GSM mobile phone. Now consider a SGP with two SIM cards. For a SGP having two SIM cards, each SIM card can be used independently to establish a Voice Channel on a respective GSM network. It will be appreciated by a person skilled in the art that the two SIM cards do not have to be provided by the same GSM Service Provider (mobile operator). Usually there are multiple GSM mobile operators that provide GSM network at any given geographic location. In the embodiments, the SGP uses a new Vocoder that has an overall data rate of $2 \times R_{GSM}$ bps. A Vocoder having a data rate of $2 \times R_{GSM}$ bps will deliver significantly superior performance in terms of voice quality as compared to a Vocoder having a data rate of $R_{GSM}$ bps.

When someone wishes to use a SGP as the Enhanced User Terminal to have voice communication with another person using a SGP as the Enhanced User Terminal, the Vocoder for the SGP generates a digital stream at a rate of $2 \times R_{GSM}$ bps. Further, the SGP splits the digital stream into two streams of data rate $R_{GSM}$ bps each, uses two SIM cards to establish two GSM Voice Channels with the SGP of the other party, and then transmits the two data streams independently over the two GSM Voice Channels to the SGP of the communicating party. The receiving party's SGP takes the signals simultaneously received from the two GSM Voice Channels, and converts them back to the two digital streams of data rate $R_{GSM}$ bps each. It then combines the two data streams to obtain a digital data stream having rate $2 \times R_{GSM}$ bps. This stream is fed to the SGP's new Vocoder which then generates the voice signal for the receiving party.

In the example embodiment described above, the Enhanced User Terminal is described in terms of GSM Standard. However, it will be understood to those skilled in the art that Enhanced User Terminals using other wired and wireless technologies can also be similarly described.

The Enhanced User Terminal for data communications described in FIG. 10 may be similarly applicable to voice communications with components catered to the processing of Voice information. As described earlier, the selection of number and type of Voice Channels to be used and other parameters required for the various modules, e.g. Input/Output Processing Modules, Splitter/Combiner Modules, etc, are provided by the Transmission and Reception Logic Assemblies 1002, 1022.

When a call is made between two Enhanced User Terminals, the logic assemblies of both Enhanced User Terminals perform the necessary handshaking to determine the number of available channels, L, available for transmission and reception. During transmission in Voice Communication, the Input Processing Module 1004 may be a speech encoder that converts the input speech into digital data. This is followed by splitting, encryption and/or encoding, and transmission by the subsequent components 1006, 1008 and 1010.

Reversely, should the Enhanced User Terminal 1000 be receiving an M number of data streams, the M data streams are first received by respective Receivers of the Receiver Module 1030. The Data streams are then decrypted and/or decoded by respective data decryption/decoding units of the Data Decryption/Decoding Module 1028. The decrypted/decoded data streams are then reconstructed (combined) by the Combiner 1026. Finally, the reconstructed (combined) data is processed by a speech decoder in the Output Processing Module 1024 into the audio output for use by the User.

As described earlier, the Transmitter Module 1010 and Receiver Modules 1030 may be combined to form a single Transceiver Module comprising a plurality of Transceiver Units, each unit capable of transceiving on its own communication channel. Further, in contrast to the Enhanced User Terminal 1000, the Splitter 1006 may follow Data Encryption/Encoding Module 1008 instead of preceding it. In such an embodiment, the Data Encryption/Encoding Module 1008 may then comprise one data encryption/encoding unit. Similarly, the Combiner 1006 may follow Data Decryption/Decoding Module 1028 instead of preceding it and in such an embodiment, the Data Decryption/Decoding Module 1028 may then comprise one decryption/decoding unit.

Figure 12:
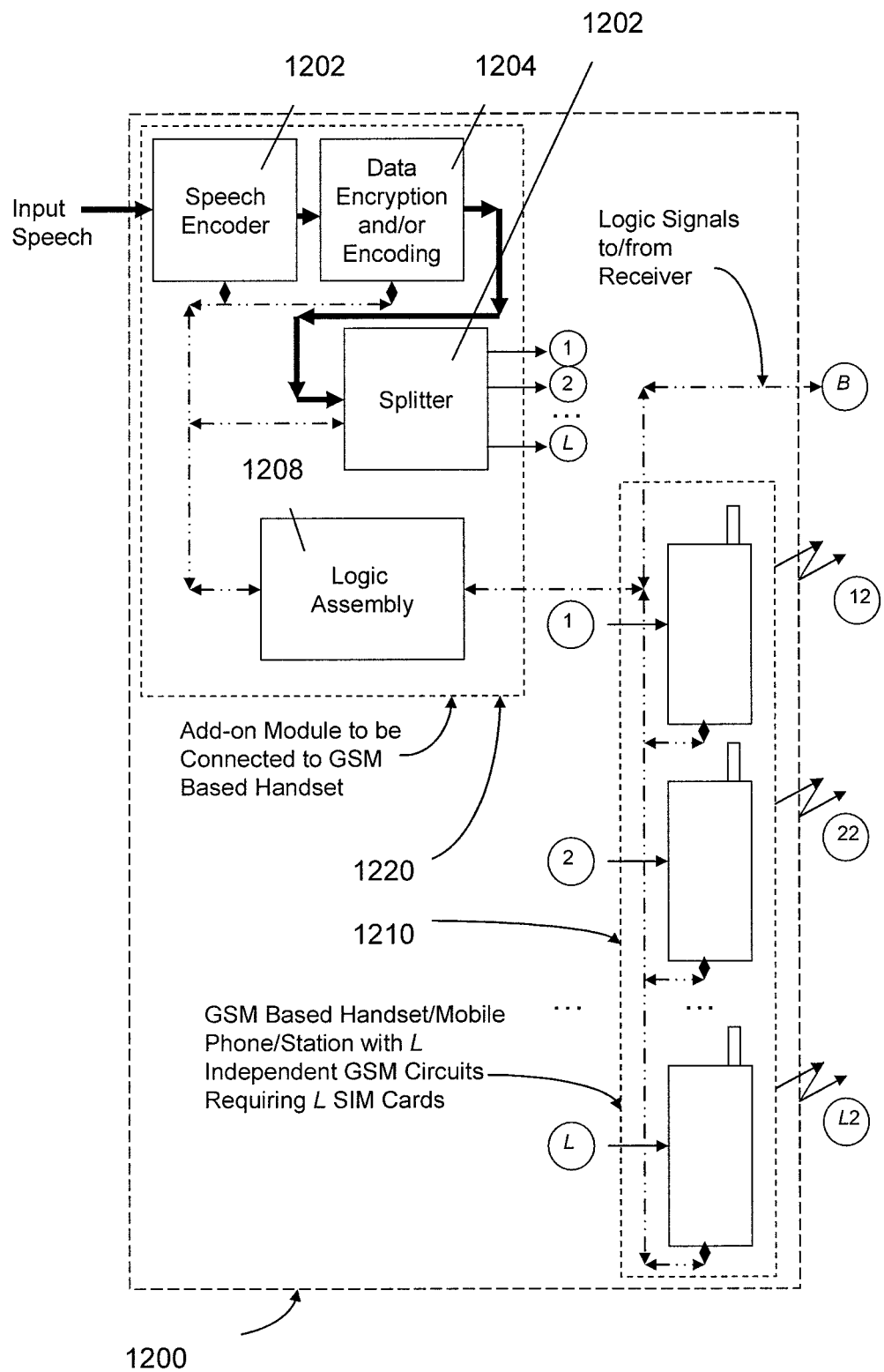
FIG. 12 shows a schematic block diagram of a transmission half of a user terminal according to an example embodiment.

A distinction may be made between the transmission and reception halves of the Enhanced User Terminal. FIG. 12 shows an example embodiment of the modules in the transmission half 1200 of an Enhanced User Terminal. In this embodiment, input speech is encoded into digital data by the Speech Encoder 1202 before encryption/encoding by the Data Encryption/Encoding Module 1204, Splitter 1206 then splits the data from the Data Encryption/Encoding Module 1204 into the pre-determined L channels for transmission by a Transmitter Module 1210. The Transmitter Module 1210 may comprise e.g. GSM Based Handsets/Mobile Phone/Station with L independent GSM Circuits Requiring L SIM cards. The Speech Encoder 1202, the Data Encryption/Encoding Module 1204, Splitter and Logic Assembly 1208 may be housed together as a separate Transmission Data Processor 1220 which may function as an add-on module to a Transmitter Module 1210.

Figure 13:
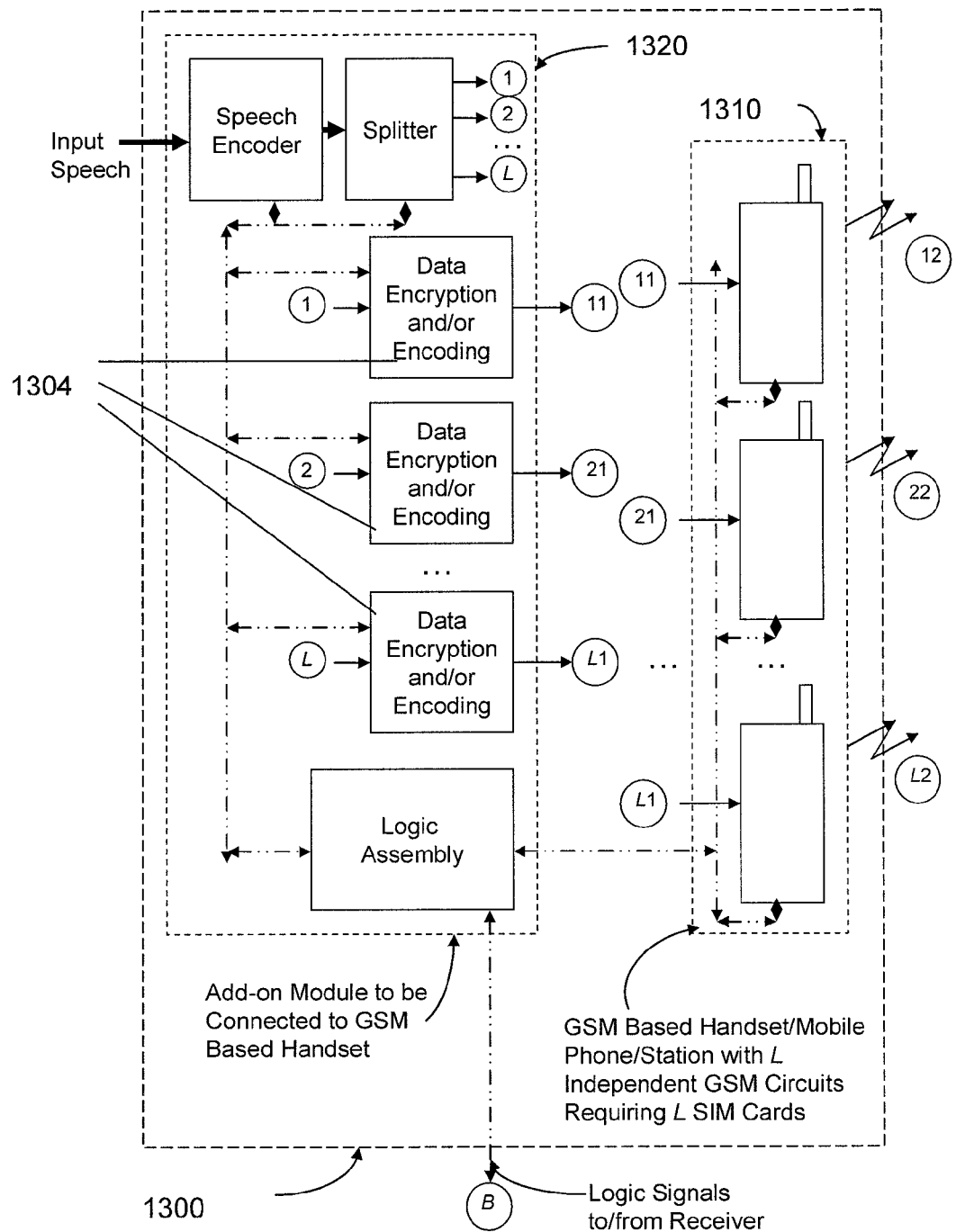
FIG. 13 shows a schematic block diagram of a transmission half of a user terminal according to an example embodiment.

FIG. 13 shows an alternative embodiment of the modules in the transmission half 1300 of an Enhanced User Terminal, where the data encryption/encoding is carried out after splitting. Here, the Transmission Data Processor 1320 comprises L number of Data Encryption/Encoding Units 1304. The Transmission Data Processor 1320 may function as an add-on module to the Transmitter Module 1310.

Figure 14:
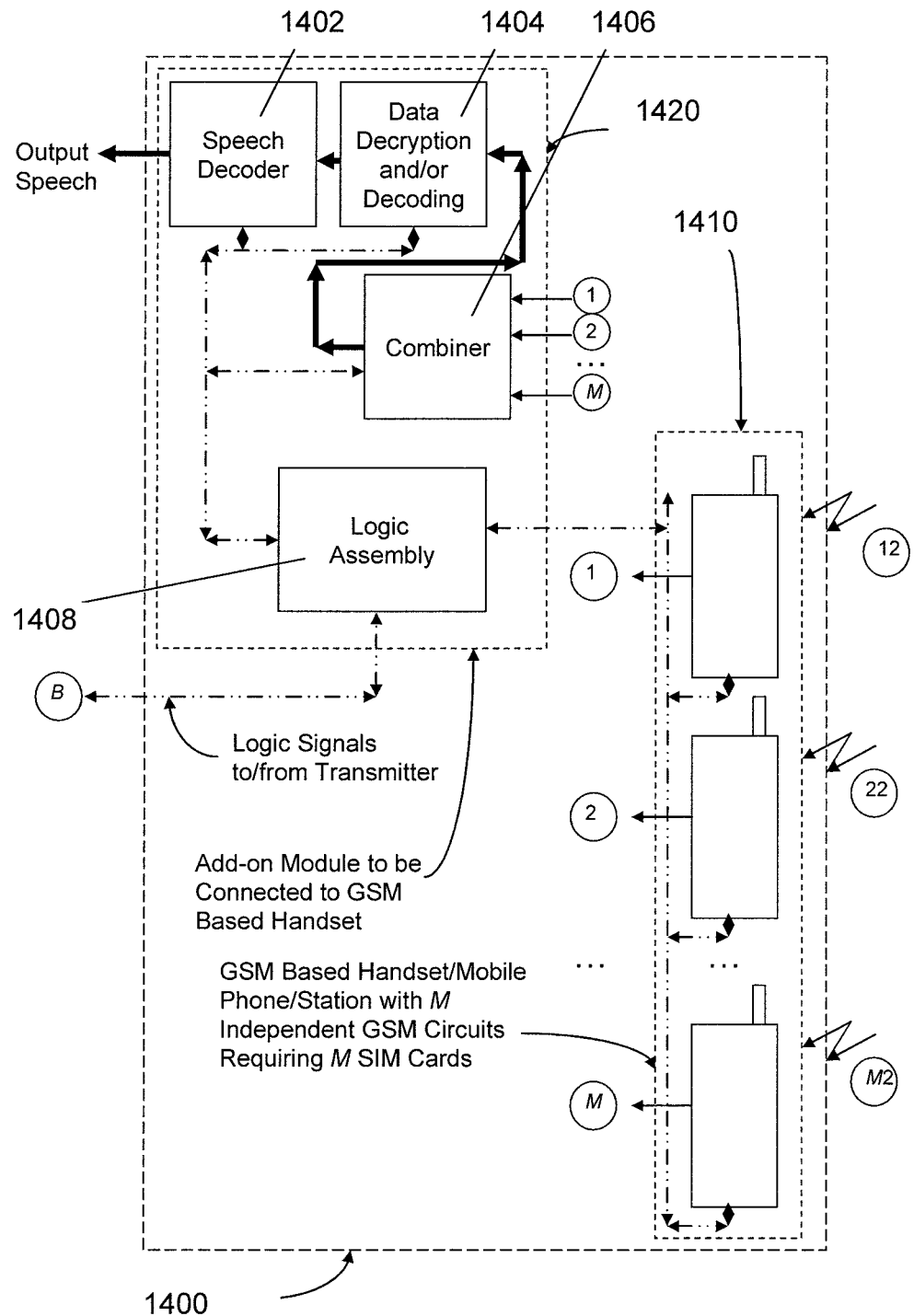
FIG. 14 shows a schematic block diagram of a reception half of a user terminal according to an example embodiment.

FIG. 14 shows an example embodiment of the modules in the reception half 1400 of an Enhanced User Terminal. In this embodiment, M channels of data is received by the Receiver Module 1408. The data is subsequently combined at the Combiner 1406 for further decryption and decoding by the Data Decryption/Decoding Unit 1404 and Speech Decoder 1402. The Receiver Module 1408 may comprise e.g. GSM Based Handsets/Mobile Phone/Station with M independent GSM Circuits Requiring M SIM cards. The Speech Decoder 1402, the Data Decryption/Decoding Module 1404, Combiner 1406 and Reception Logic Assembly 1408 may be housed together as a separate Reception Data Processor 1420 which may function as an add-on module to a Reception Module 1410.

Figure 15:
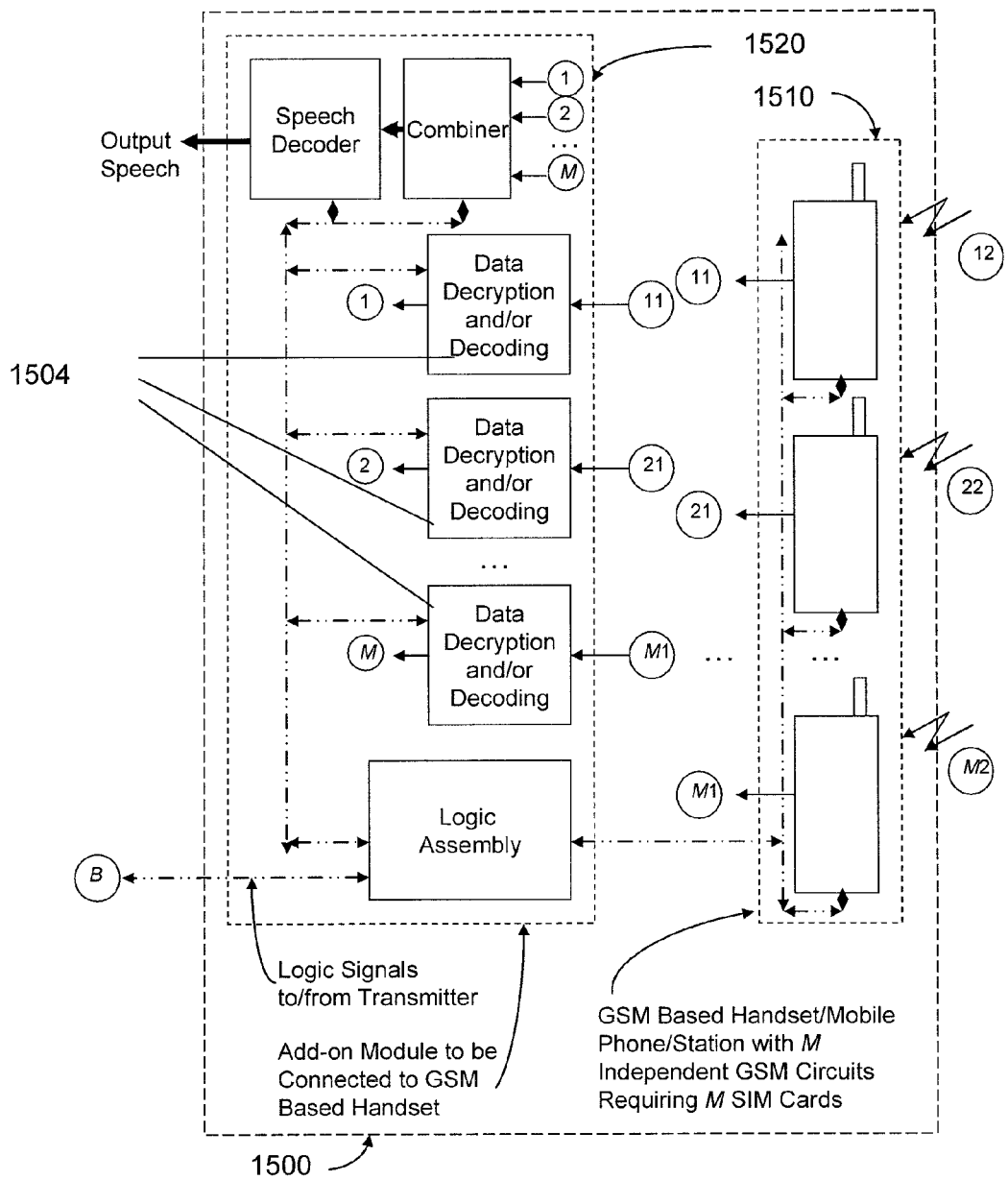
FIG. 15 shows a schematic block diagram of a reception half of a user terminal according to an example embodiment.

FIG. 15 shows the alternative embodiment of the modules in the reception half 1500 of an Enhanced User Terminal, where the data received is decrypted and/decoded before they are combined. Here, the Reception Data Processor 1520 comprises M number of Data Decryption/Decoding Units 1504. The Reception Data Processor 1520 may function as an add-on module to the Reception Module 1510.

Figure 16:
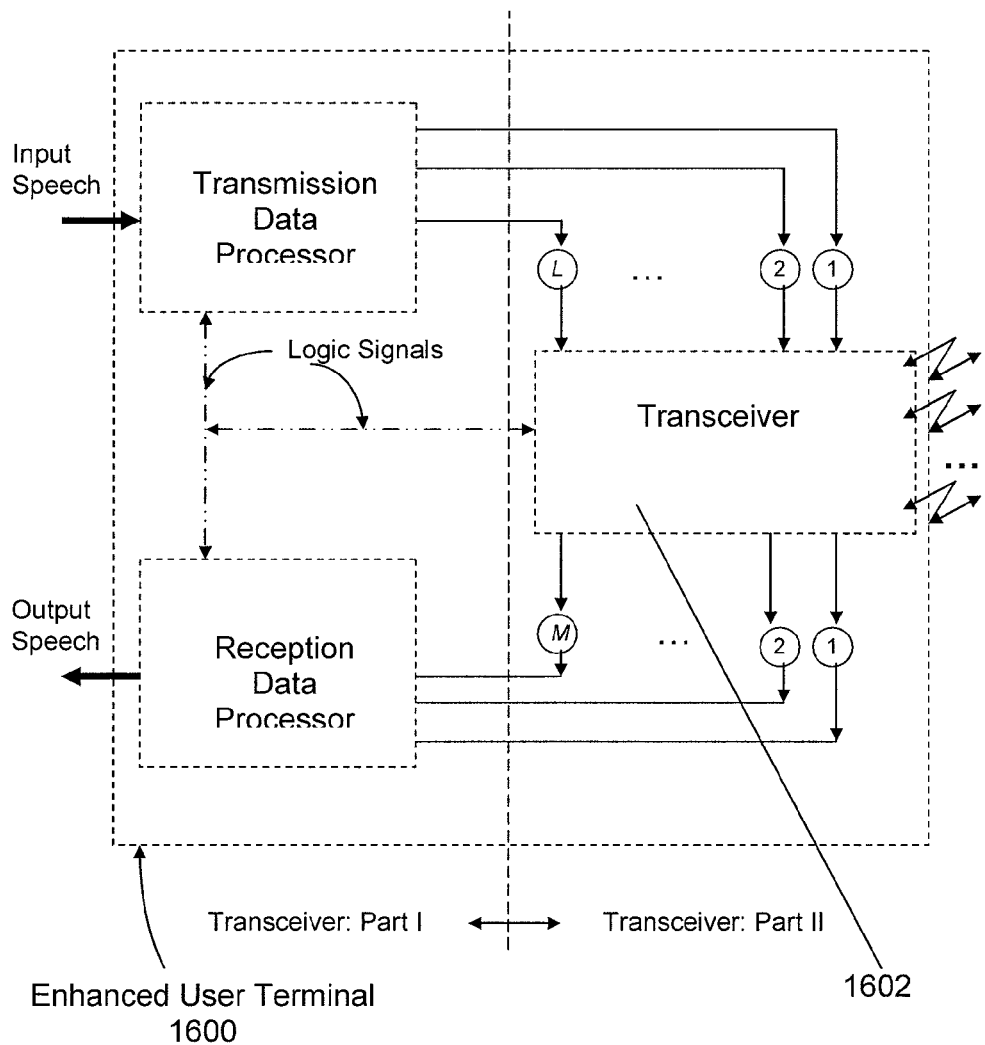
FIG. 16 shows a schematic block diagram of a user terminal according to an example embodiment.
Figure 17:
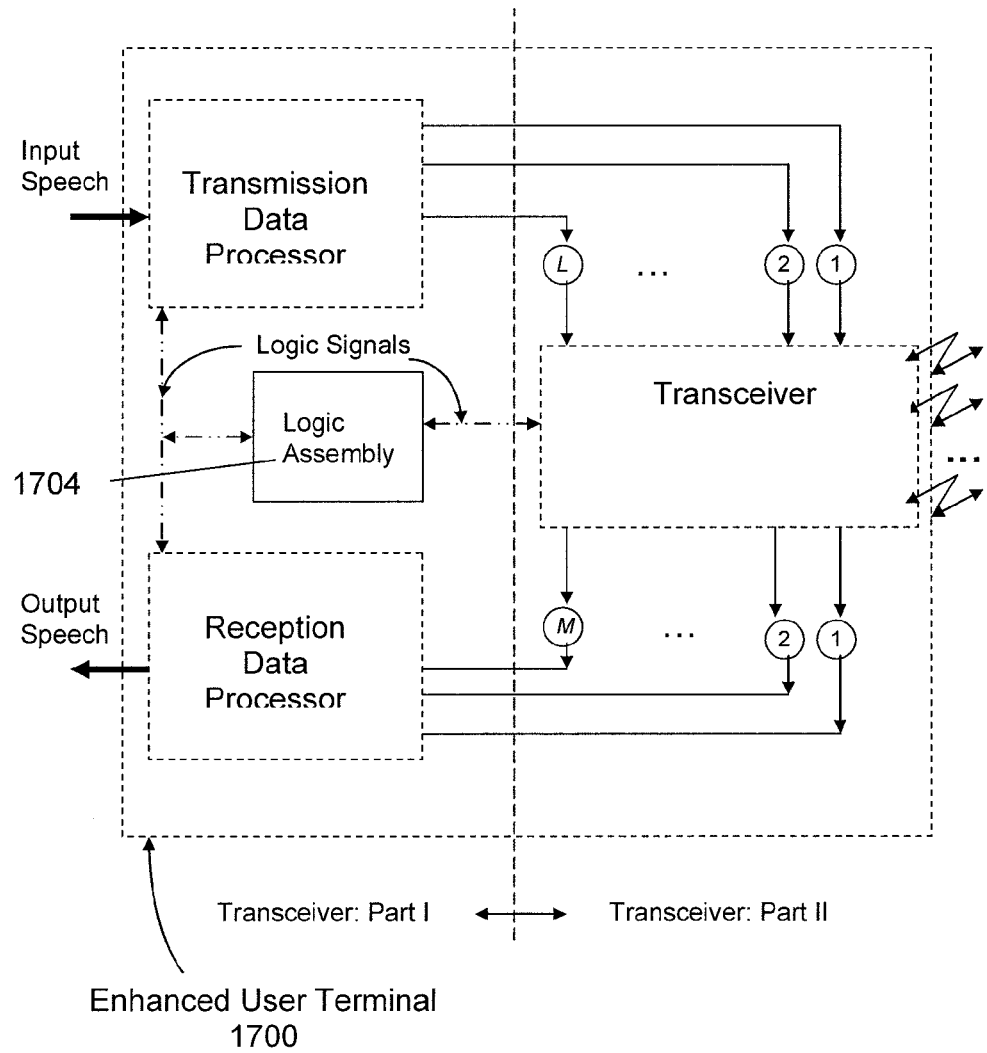
FIG. 17 shows a schematic block diagram of a user terminal according to an example embodiment.

FIG. 16 and FIG. 17 show embodiments of the Enhanced User Terminal 1600, 1700 combining the transmission and reception halves illustrated in FIGS. 12-15. In FIGS. 16 and 17, the Transmitter Module e.g. 1210 (FIG. 12) is combined with the Receiver Module e.g. 1410 (FIG. 14) to form a single Transceiver Module 1602. Instead of separate Logic Assemblies for the Transmission and Receiver units, there may be only one Logic Assembly 1704 for the entire Enhanced User Terminal 1700.

The "Add-on Module" (Transmission and Reception Data Processors) may be linked to the "Transceiver Module" (e.g. GSM Based Handset) via a Bluetooth link or with cables using the hands-free sockets of the GSM handsets if the two modules are realized separately for the Enhanced User Terminal.

The "Add-on Module" and the "Transceiver" modules may also be placed in the same assembly of the Enhanced User Terminal. In this case, the digital data coming out of the "Add-on Module" can be directly copied onto the GSM voice buffers for the respective GSM Channels of the "GSM Based Handset" for transmission. Similarly, the digital data coming out of the GSM voice buffers for the respective GSM Channels of the "GSM Based Handset" can be directly copied to the "Add-on Module" for Receipt.

In most embodiments the maximum number of Communication Channels in the Transmitters (L) and the Receivers (M) will be the same, as one SIM card can be used to set up one Channel for both the Transmitter as well as a Receiver. The same goes for the actual number of Channels used at any point in time. However there can be scenarios where the total number of Channels and the number of Channels used in the Transmitter and Receiver are different. For instance, a mobile operator may provide for an Enhanced User Terminal with two GSM Channels from the Enhanced User Terminal to the Base Station. The Enhanced User Terminal may use both Channels for transmission from the Enhanced User Terminal to the Base Station. The Mobile Operator Infrastructure combines the received digital streams into a single data stream before transmitting it over a single land-line Voice Channel to a regular phone based User Terminal. On the return path, it may use only one GSM Channel from the Base Station to the User Terminal.

FIG. 18 and FIG. 19 show block diagrams of Multiple Voice Channel Communication between two Enhanced User Terminals. Multiple Voice Channels are used simultaneously along with Data Encryption and Coding to provide for improved performance. Since the multiple Voice Channels that are established for voice communication conform to a Standard, the Enhanced User Terminal(s) can utilize the existing Communications' Networks including the Internet for voice communication.

Figure 20:
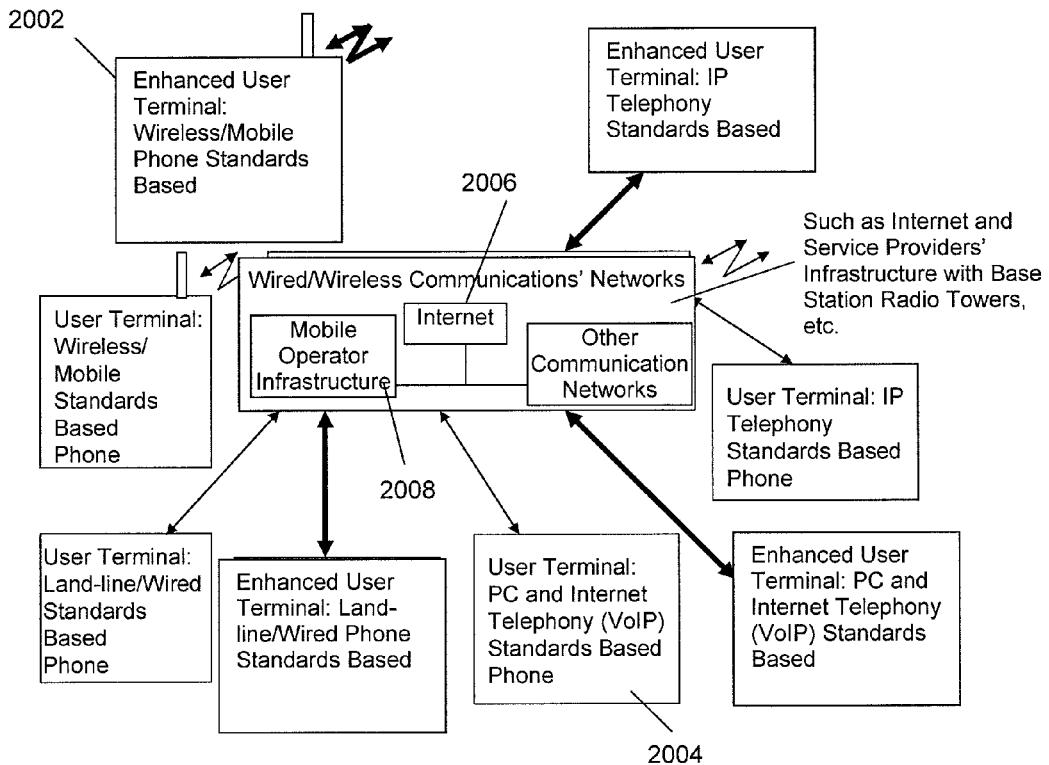
FIG. 20 shows a schematic block diagram illustrating communication between user terminals for voice communication, according to an example embodiment.

Enhanced User Terminals used by two parties in communication do not necessarily have to be of the same type or use the same type of Voice Channels. This is shown in FIG. 20. For instance, consider a GSM Standard based Enhanced User Terminal 2002 using e.g. 5 GSM Channels in voice communication to a PC based User Terminal 2004 with only one VoIP Channel. This is done in a way that the data streams received from the GSM Standards based Enhanced User Terminal 2002 are combined by the Mobile Operator Infrastructure 2008 and then transmitted over the Internet 2006 after it is recoded for a single Internet based Voice Channel as per the Internet voice communication Standard. Similarly a single stream received from the Internet 2006 is recoded by the Mobile Operator Infrastructure 2008 for transmission over the GSM Standards based Voice Channels to the Enhanced User Terminal 2002.

In the embodiments of the present invention, the Voice Channels established using the SGP described above should satisfy the GSM Standards. SGP may also incorporate additional functions such as coding/decoding for error control, encryption/decryption for security, and so on. This can be done in an adaptive manner depending on the channel conditions, performance level required, and other user based factors. Also, the SGP does not have to use all its Voice Channels at all times. A SGP with L mobile Voice Channels may use any number of Voice Channels from 1 to L at any time. The particular Voice Channels (number as well as selection of that many Channels from the total of L Channels) to be used for a particular voice communication becomes a function of user settings (cost may be one consideration), preferences, system performance required, and so on. The selection of Voice Channels may also be changed during a voice communication. The SGPs of two parties in voice communication with each other may also exchange information about the number of Voice Channels used, the exact parameters of the new Vocoder and other system blocks that carry out tasks such as encryption/decryption, coding/decoding for error control and so on.

In another instance, an Enhanced User Terminal can consist of a total of L mobile Voice Channels of which J Channels are based on GSM mobile Standard while the remaining K (K=L−J) Channels are based on 3G mobile Standard. A User Terminal with L mobile channels may use any number of channels from 1 to L at any time. The particular Voice Channels (number, type whether GSM or 3G, as well as selection of channels from the available J GSM and K 3G channels) to be used for a particular voice communication becomes a function of user settings (cost may be one consideration), preferences, system performance required, and so on. It will be appreciated by a person skilled in the art that a wireless/mobile technologies' based Enhanced User Terminal can have one or more of different types of wireless/mobile Channels such as GSM, 3G, CDMA, WI-FI, and WiMAX to name a few. An Enhanced User Terminal may also have a mixture of wireless and wired Channels.

In the embodiments of the present invention for Voice Communication, the Channels for the Transmitter and Receiver of an Enhanced User Terminal can be of the type (i) mobile phone (2G and/or 3G) based; (ii) Land-line phone based; and (iii) WI-FI, Internet, and VoIP based. Two User Terminals in communication with each other do not need to have the same type of Channels nor the same type of Transmitters and Receivers. The Enhanced User Terminal may also be realized in hardware or in software or a combination of the two. For instance, the functionality of the Speech Encoder/Decoder, Encryption/Decryption, and Coder/Decoder in a PC/VoIP based User Terminal may be realized in software that runs on general purpose hardware as provided by a standard PC.

In the example embodiments of the Enhanced User Terminal, several pairs of Splitter/Combiner may be used. In total, there are as many Splitters as Combiners in the transmission. Splitters and Combiners may also be utilized in the "Service Provider Infrastructure" block as well as "Communications' Networks including Internet" block. For instance, a Service Provider may provide 3 GSM Channels enabled via 3 SIM cards to a consumer for mobile to PC calling. It can use a Combiner in its Infrastructure to combine the data received from the three GSM Channels for onward transmission on the Internet to the destination PC. Similarly, it can use a Splitter in its Infrastructure to split the data received from the Internet as suited for three GSM Channels for onward transmission to the mobile.

The numbers and type of Channels to split the signal into and other parameters of the Splitter may be dynamically chosen depending on the desired speech quality, the Speech Encoders/Decoders used, cost, and other considerations. Alternatively, the number and type of Channels to split the signal into and other parameters may be pre-selected and the speech coding/decoding, splitting etc is carried out accordingly.

The Combiner has complete knowledge of the Splitter characteristics (the numbers of channels the signal is split into and other parameters etc) in order to carry out combination of the various channels. Similarly, the Splitter has complete knowledge of the Combiner characteristics.

With regards to the Speech Encoder, Speech Decoder; Data Encryption and/or Encoding, Data Decryption and/or Decoding Modules, the number and type of Channels can be chosen first. Subsequently, based on the number and type of Channels and other desired performance indicators, determine the procedures to be followed by the Modules listed above. Alternatively the number and type of Channels can be determined based on overall system requirements and then the procedures to be followed by these modules can be determined.

The characteristics of the Speech Encoder, Speech Decoder; Data Encryption and/or Encoding, Data Decryption and/or Decoding Modules, e.g. the number and type of Channels, algorithmic structure of the speech coders/decoders, encryptors/decryptors, encoders/decoders, etc., may be chosen a priori or dynamically in real-time so as to ensure that the the overall signal sent on each of the Channels meets the Channels' characteristics at all times while providing for desired performance. For instance in a GSM based Enhanced User Terminal, the code rate for the Encoder and the digital data coming out of the Speech Encoder may be traded in real-time in a way that the overall data rate over each of the Channel remains the same and as per GSM Channel specifications while providing for adaptive error control over channels whose characteristics are time-varying. The output of the Speech Encoder can also change depending on the number and type of Channels (maximum of L Channels) and other factors as described.

In the example embodiments, the characteristics of Speech Encoder, Data Encryption and/or Encoding blocks are known to the corresponding Speech Decoder, Data Decryption and/or Decoding blocks. This can ensure that the respective operations (speech coding and decoding, data encryption and decryption, data encoding and decoding etc) can be carried out in an appropriate manner.

In the example embodiments, it is the task of the Logic Assembly to ensure that the overall system works as per specifications. The various units of the Enhanced User Terminal (Transmitter, Receiver and others) function under its control. It is the task of the Logic Assembly to choose the number and type of Channels (maximum of L Channels) and various parameters and characteristics associated with the Speech Encoder, Data Encryption and/or Encoding, Splitter, Speech Decoder, Data Decryption and/or Decoding, and Combiner blocks. It also works with the Transmitter Module (GSM based Handset) for functions such as dialing out multiple addresses (mobile phone numbers for instance) for voice communication and so on.

In addition, the Logic Assembly in the example embodiments also co-ordinates functions between the Enhanced User Terminal Transmitter, the Service Providers' Infrastructures, Communications' Networks including Internet, and the Enhanced User Terminal Receiver.

In the embodiments, the Transmitter Module of an Enhanced User Terminal has a maximum of L Channels while the Receiver Module of an Enhanced User Terminal has M Channels where L and M may not be equal in general. Two Enhanced User Terminals in voice communication can be of completely different type. Therefore if two Enhanced User Terminals, say Enhanced User Terminal 1 and Enhanced User Terminal 2, are in communication, the number and type of Channels for Enhanced User Terminal and Enhanced User Terminal 2 can be of completely different nature. These Channels follow the respective Standards of well-known data communication protocols. For a mobile Standards based Enhanced User Terminal, this is accomplished by L (or M) circuits of the respective mobile system (CDMA, GSM, 3G, UMTS etc). For a wireless Standards based Enhanced User Terminal, this is accomplished by simultaneously circuits for L (or M) wireless Channels. For the land-line based Enhanced User Terminal, this is accomplished by L (or M) land-lines (one Channel per land-line). For the PC/VoIP systems, this is accomplished by using L (or M) simultaneous Voice Channels of the type provided by MSN, YAHOO, SKYPE, for instance.

Application in Digital Television

Figure 21:
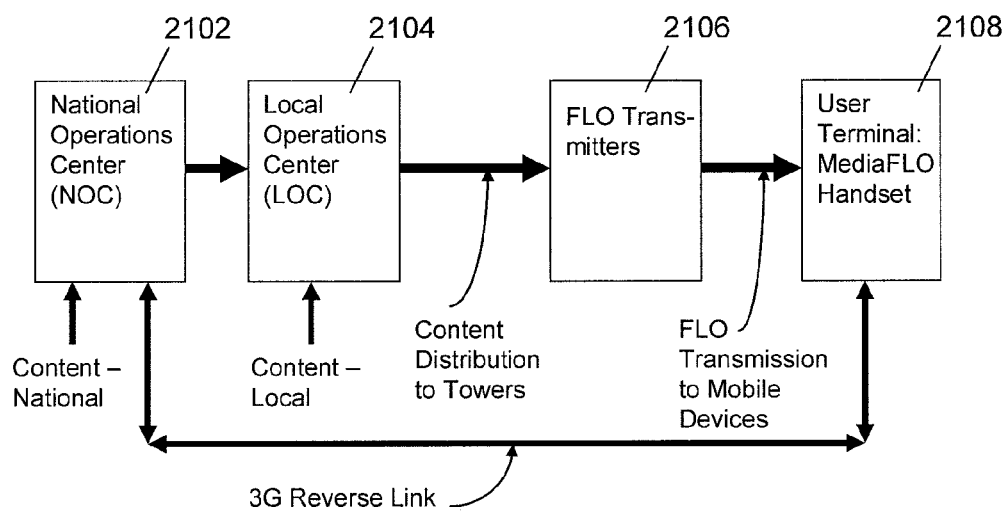
FIG. 21 shows a schematic block diagram illustrating communication between user terminals for voice communication, according to an example embodiment.

Embodiments for the delivery of data from a Data Server/User Terminal to a User Terminal have been described. The earlier systems allow the delivery of data (and vice-versa) on an anytime, anyplace basis. On the other hand, TV broadcast is different from this scenario. TV signals are sent according to a fixed time schedule and the information is once again organized as TV Channels. Delivery of information via TV is now being done using digital techniques as the information is being broadcast as digital data. This is valid for all types of TV Channels, be it Satellite TV, Cable TV, or Mobile TV. The most recent is the Mobile TV where the example competing Standards are e.g. MediaFLO and DVB-H. A block diagram for a MediaFLO Network is shown in FIG. 21. The TV Channels follow a certain Standard and the user has to select the appropriate TV Channel on the User Terminal at a pre-scheduled time in order to receive a certain program. In the embodiment, the National Operations Center (NOC) 2102 transmits national content to the Local Operations Center (LOC) 2104 which further processes the national content into local content, e.g. adds local advertisements etc. The local content is then distributed via transmission towers and received by FLO transmitters 2106 which finally transmits the FLO transmission to User Terminals 2108.

Based on the systems and methods described earlier, other embodiments may improve the quality of TV Channels and hence provide for higher resolution multi-media data while continuing to adhere to whichever Standard is being used for the TV broadcast. In the embodiments, instead of coding the multi-media data for TV transmission for transmission over one TV Channel, the data is coded for transmission over multiple TV Channels simultaneously. For example, assuming the highest resolution multi-media is represented by a file F and it is coded into a file F1 for transmission over one TV Channel. The embodiments of the present invention may code the file F into multiple sub-files. The method may be described as follows:

(i) the file F is coded into e.g. L sub-files F1, F2, . . . , FL such that each of the L multi-media sub-file can be transmitted over one TV Channel.

(ii) The L multi-media sub-files are transmitted simultaneously as content of L TV Channels (iii) Assuming the user wishes to use the User Terminal in the example embodiments to receive the multi-media data using M TV Channels simultaneously. The User Terminal receives the M multi-media sub-files F1, F2, . . . , FM by tuning into the first M TV Channels simultaneously.

(v) The User Terminal then combines the multi-media sub-files for the M TV Channels F1, F2, . . . , FM to construct a high resolution data file and either displays it or stores it for later viewing by the user.

Incremental Resolution Coding

The multi-media data in its highest resolution form is F and it is sent as the sub-file F1 for only one TV Channel. In the embodiments, the L sub-files F1, F2, . . . , FL are coded in a way that a User Terminal that wishes to use two TV Channels simultaneously tunes, receives and combines F1 and F2, while a User Terminal that wishes to use three TV Channels simultaneously tunes, receives, and combines F1, F2, and F3, and so on. The coding of these files is done in a way that the sub-file F1 for multi-TV Channel transmission as per the Invention is same as the file F1 for single TV Channel transmission of multi-media data. The remaining sub-files F2, . . . , FL are coded from F in a way that the resolution of the file constructed from F1, F2, . . . , FA is greater than the resolution of the file constructed from F1, F2, . . . , FB as long as A is greater than B. In other words, the coding is such that the resolution increases as more sub-files are combined at the receiver to construct the multi-media data. Such a coding of multi-media channels is termed "Incremental Resolution Coding".

Partial Incremental TV Channel Coding

In some instances, each of the sub-files F2, F3, . . . , FL may not be suitable for transmission over one TV Channel. Let us say that the coding of multi-media files is such that the sub-file F2 is only ⅓ the size that is suitable for one TV Channel. In this case, the sub-files G2 and H2 of two other multi-media files G and H (for two other TV Channels) are combined with F2 into a single sub-file A2 suitable for one TV Channel and transmitted as such. The TV receiver receives the sub-files F1 and A2, extracts F2 from A2, and combines F1 and F2 to construct the multi-media file.

Figure 22:
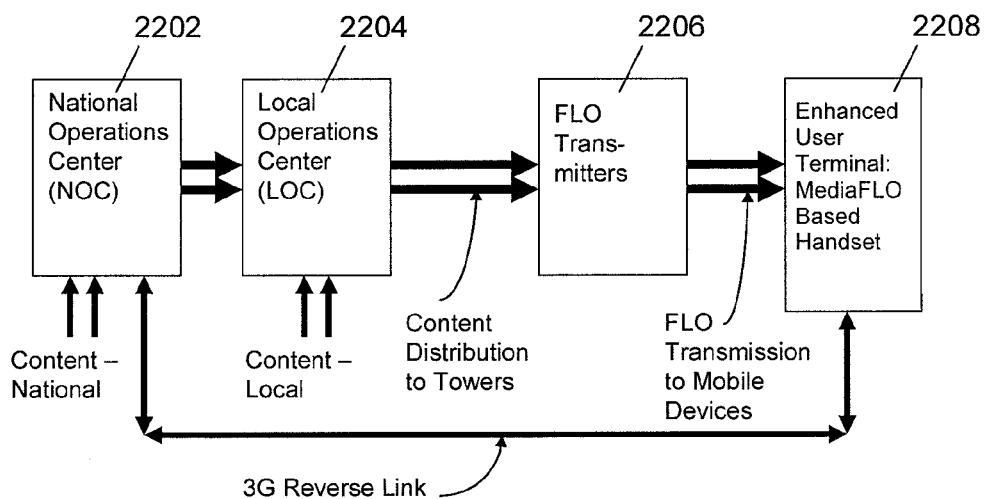
FIG. 22 shows a schematic block diagram illustrating communication between user terminals for voice communication, according to an example embodiment.

FIG. 22 shows a block diagram illustrating an embodiment of the present invention based on MediaFLO Network for Mobile TV. In the embodiment illustrated in FIG. 22, the National Operations Center (NOC) 2202 transmits national content to the Local Operations Center (LOC) 2204 which further processes the national content into local content, e.g. adds local advertisements etc. The local content is then distributed via transmission towers and received by FLO transmitters 2206 which finally transmits the FLO transmission to Enhanced User Terminals 2208. As the FLO transmitters 2206 transmit more than one (L) channels of information at any one time, the Enhanced User Terminal 2208 may receive L sub-files simultaneously to construct the multi-media file. Those skilled in the art will recognize that similar block diagram can also be drawn for the Invention for TV Channels that are Satellite or Cable Standards based or based on other Mobile TV Standards.

Figure 23:
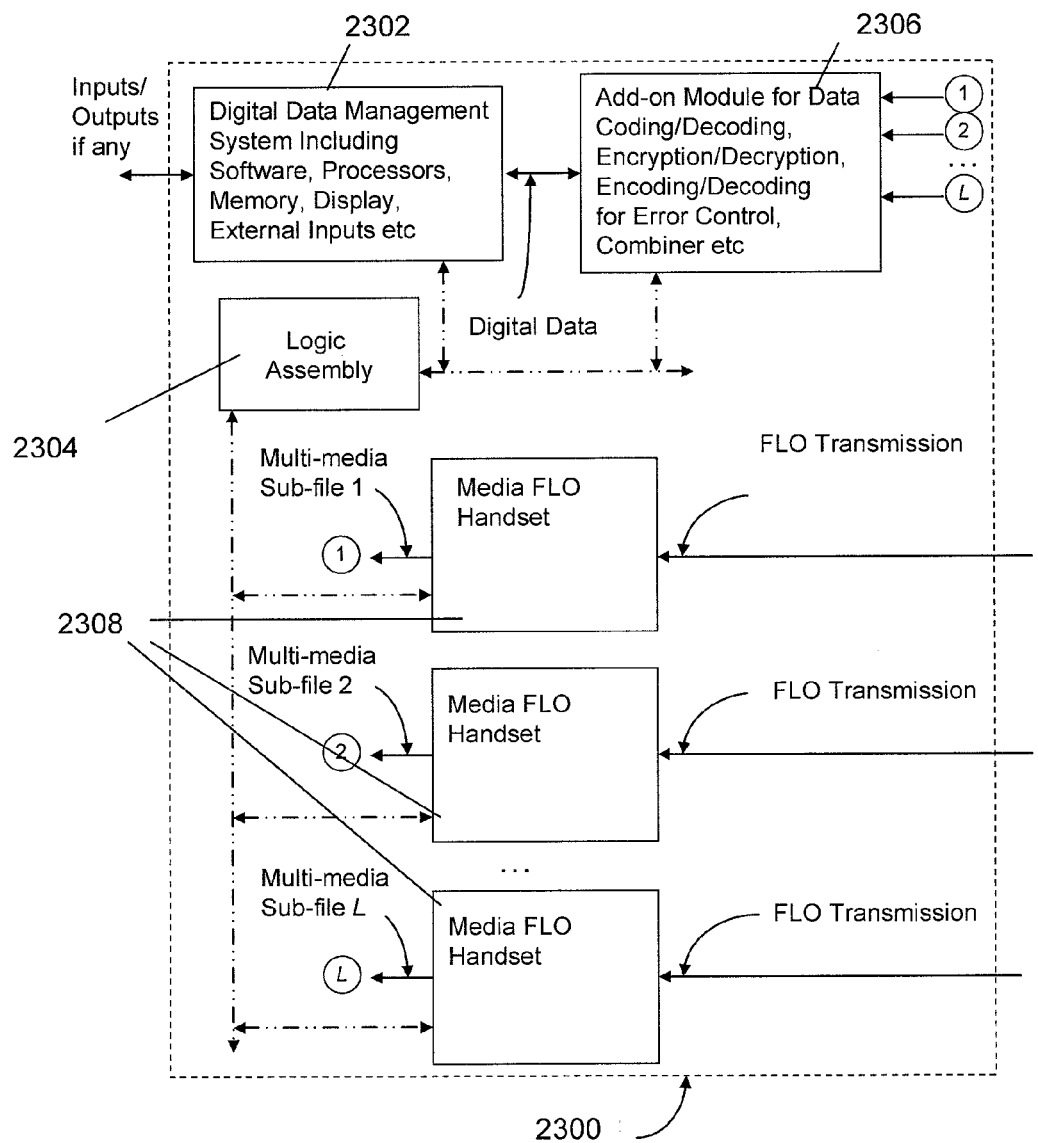
FIG. 23 shows a schematic block diagram of a user terminal according to an example embodiment.

FIG. 23 shows the block diagram for an Enhanced User Terminal 2300 as used in the example embodiment for MediaFLO Standard based Mobile TV. This Enhanced User Terminal 2300 is similar to the Enhanced User Terminal 1100 described in FIG. 11. The Digital Management System 2302 combines the input and output processing modules into a single interface for processing forms of input into digital data when transmitting and processing digital data into output format when receiving. The Encryption/Encoding, Decryption/Decoding, Splitter, Combiner Modules are all housed in an Add-on Module 2304, while the transceiver units 1102 (FIG. 11) have been replaced by Media FLO handsets 2306, each Media FLO handset providing FLO transmission over a channel. A combined logic assembly 2308 controls the functions of the various modules, e.g. Add-on Module 2304, Digital Data Management System 2302, Media FLO handsets 2306 etc. Those skilled in the art will recognize that similar block diagram can also be drawn for Enhanced User Terminals as used in the example embodiments for Satellite or Cable Standards based TV Channels.

Digital Channels in the MediaFLO Standard

In example embodiments, digital multi-media content is sent over multiple TV Channels in order to provide higher resolution to the user. Hence these multiple channels need to be available and provided for. This is rather straightforward for TV content delivered via Satellite or Cable as there are hundreds of TV Channels that are possible with many channels remaining un-utilized. A concern might be availability of such channels for Mobile TV. For example, a FLO-based programming lineup that utilizes 30 frames-per-second (fps) QVGA (a Quarter Video Graphics Array or 240×320 pixels) with stereo audio includes 14 real-time streaming video Channels of wide-area content (ex. national content) and 5 real-time streaming video Channels of local market-specific content. This can be delivered concurrently with 50 nationwide non-real-time Channels (consisting of pre-recorded content) and 15 local non-real-time Channels, with each Channel providing up to 20 minutes of content per day. Not all these Mobile TV Channels may be utilized for delivering multi-media content at all times. Hence Mobile TV Channels, which are not being utilized for delivery of multi-media content at a particular time, can be used as described in the embodiments to provide for higher resolution (in terms of bigger screen size and/or higher number of fps etc) for delivery of multi-media content via multiple Channels at that time.

Figure 24:
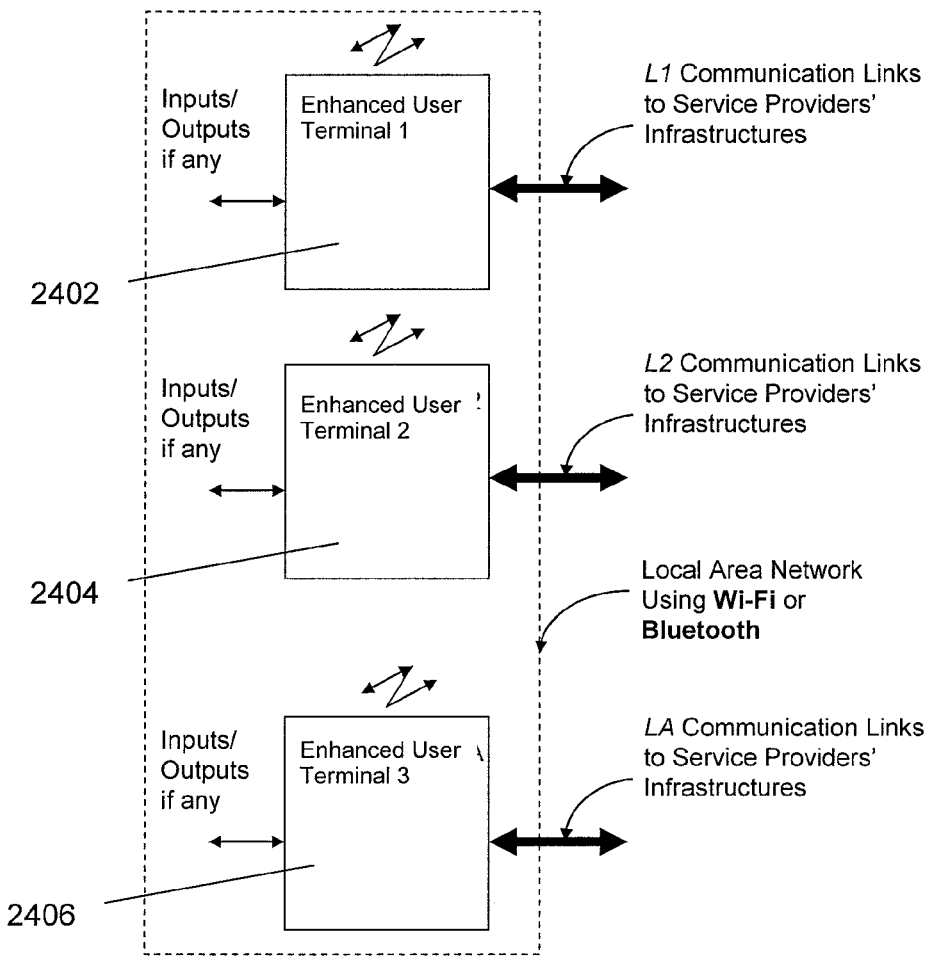
FIG. 24 shows a schematic block diagram of a data communication system according to an example embodiment.

In the example embodiments, the performance of overall data communication may be improved by having the Enhanced User Terminals as used in the example embodiments in geographic proximity to detect each other and mutually exchange with each other the multi-media files that they receive from the other User terminals/Data Servers. This is done with the objective of further enhancing the resolution of the data files at the Enhanced User Terminals. FIG. 24 shows an example embodiment of the data communication system when the Enhanced User Terminals are part of a Local Area Network. For example, say there are three Enhanced User Terminals UT1 2402, UT2 2404 and UT3 2406 that are close to each other. These Enhanced User Terminals 2402, 2404, 2406 wish to download high resolution multi-media content coded at 90 fps. However, when acting on their own they can only receive lower resolution content coded at 30 fps. In that case, each of the Enhanced User Terminals 2402, 2404, 2406 could:

(i) download multi-media content at say 30 fps using multiple Data Channels as described earlier;
(ii) exchange these frames with each other using local area network 2408 such as Wi-Fi or Bluetooth; and
(iii) use all the frames to construct high resolution multi-media content at a rate of 90 fps.

For example, if the frames for the high resolution data file at 90 fps are numbered as f1, f2, f3, f4, f5, . . . , and so on, then UT1 2402 instructs the Data Server to send frames f1, f4, f7, . . . , and so on. Similarly, UT2 2404 instructs the Data Server to send frames f2, f5, f8, . . . , and so on and UT3 2406 instructs the Data Server to send frames f3, f6, f9, . . . and so on. The User Terminals use the local area network 2408 to exchange the frames they receive from the Data Server with each other and construct the higher resolution multi-media content at 90 fps.

As Enhanced User Terminals 2402, 2404, 2406 are mobile, the configuration of the local area network 2408 can be dynamic. Consequently, the multi-media content that each of the Enhanced User Terminals 2402, 2404, 2406 receives from the Data Server will also be dynamically adjusted accordingly. For example, assuming UT1 2402 and UT2 2404 remain in the local area network while UT3 2406 has moved away. The Enhanced User Terminals UT1 2402 and UT2 2404 now instruct the Data Server to encode the high resolution data into lower resolution data at 60 fps (instead of 90 fps) and transmit alternate frames to UT1 2402 and UT2 2404. Assuming these frames at 60 fps are labeled as g1, g2, . . . , and so on, the Data Server now sends g1, g3, . . . , and so on to UT1 2402 and g2, g4, . . . , and so on to UT2 2404. UT1 2402 and UT2 2404 exchange the frames they receive from the Data Server with each other, and then use the frames g1, g2, . . . , and so on to construct the multi-media data.

Further, the number of Data Channels used by each of the Enhanced User Terminals and hence the data that it receives from the Data Server can be determined as per the number and type of other Enhanced User Terminals present in the local area network and the Data Server can be instructed accordingly to transmit lower or higher resolution files to each of the User Terminals.

Figure 25:
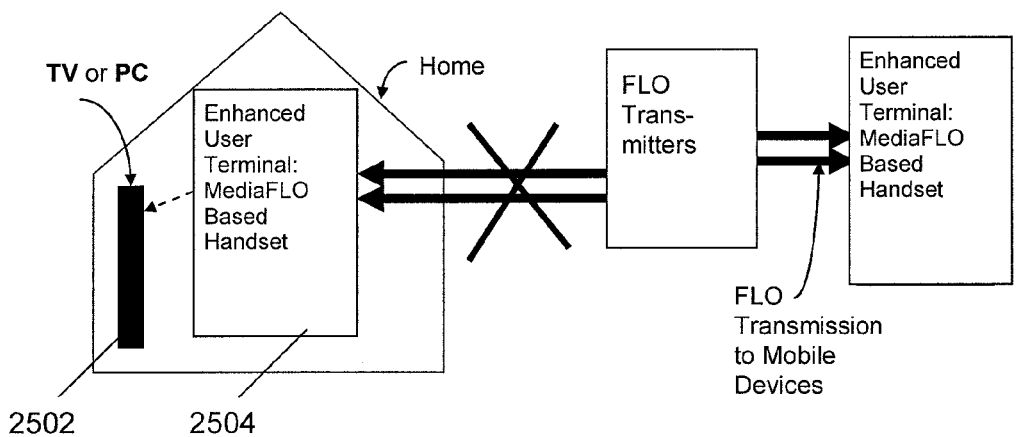
FIG. 25 shows a schematic block diagram of a data communication system according to an example embodiment.

FIG. 25 shows another embodiment of the present invention, where the Service Provider of the Mobile TV Channels also provides the Mobile TV Channels (or a higher resolution version of the Mobile TV Channels) to the users as regular TV Channels via Satellite or Cable or high speed Internet. Such regular TV Channels can be viewed using a TV or PC 2502. When the Enhanced User Terminal 2504 is detected by the Service Provider of the Mobile TV Channels to be located such that it can receive the Mobile TV Channel as a regular TV Channel, the user is switched automatically (or as initiated by the User) from the Mobile TV Channel to the regular TV Channel in a way that the viewing of the multi-media continues with no disruption.

Depending on the application, communication between an Enhanced User Terminal and a Data Server may be one-way such that data is always transferred from the Data Server to the Enhanced User Terminal. However, in general, the communication is two-way where the data is transferred in both directions from the Enhanced User Terminal to the Data Server and from the Data Server to the Enhanced User Terminal. Embodiments of the invention have been described to perform data transfer from a Data Server to an Enhanced User Terminal. However, it will be understood by those skilled in the art that the systems and methods described may similarly be applicable for two-way data transfer and is not mentioned explicitly. This may similarly be applied to two-way data communication between two Enhanced User Terminals.

Figure 28:
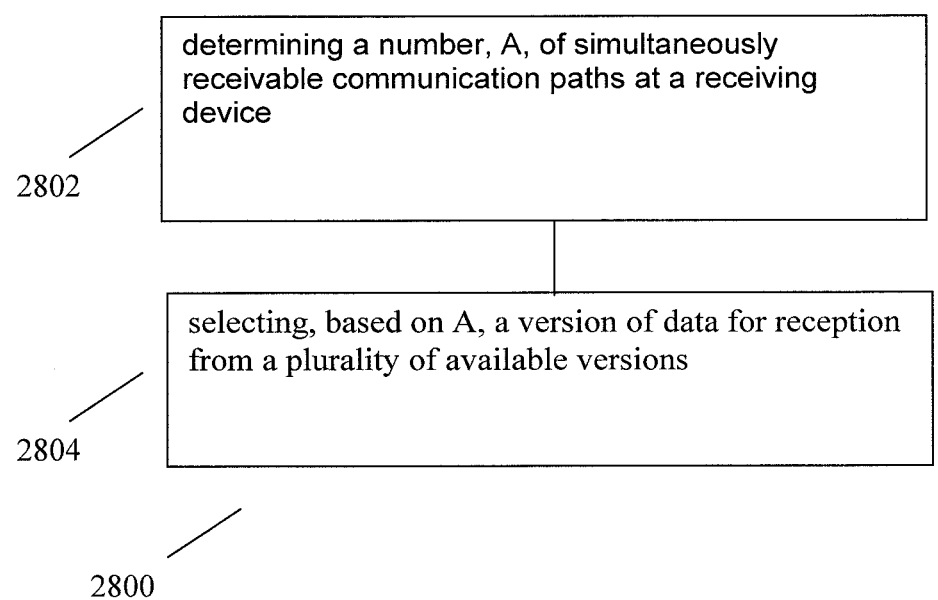
FIG. 28 shows a flowchart illustrating a method according to an example embodiment.

FIG. 28 shows a flowchart 2800 illustrating a method of conducting communication over one or more communication networks. At step 2802, a number, A, of simultaneously receivable communication path at a receiving device are determined. At step 2804, a version of data for reception from a plurality of available versions is selected, based on A.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, it will be appreciated that the various communication links/channels [or communication paths] can take a number of different forms, including, but not limited to CDMA, GMS, 3G, UMTS, WI-FI, WiMAX, LAN, CABLE, DSL, ADSL, Dial-up and UWB. Each of the communication paths can be self-sufficient and independent of the others and each provide a certain resource on the communication system and this resource can be used by a user to access the communication service. Each communication path can be assigned to the user upon request either by the user himself or by the communication system if the system recognizes the need for the user to communicate. Assignment of communication path and then the use of the communication path may be controlled by the communication service provider, and may require a user authentication and other steps. The exact nature of the communication path can be as independently determined between the user and a relevant service provider, and may itself include multiple communication sub-paths under the control of the communication system of the relevant service provider.

ABBREVIATIONS

LAN: Local area network
MAN: Metropolitan area network
WLAN: Wireless local area network
Wi-Fi: A popular name for WLAN technologies
CDMA: Code Division Multiple Access
WCDMA: Wideband CDMA
CDMA2000: Another wideband version of CDMA
UMTS: Universal Mobile Telecommunication System
PDA: Personal Digital Assistant
IS-95: second generation CDMA technology; also known as CDMAOne
2G: Second generation cellular/mobile communication systems
2.5G: 2.5 generation cellular/mobile communication systems
3G: Third generation
EDGE: Enhanced Data Rates for GSM Evolution
GPRS: General packet radio service
UWB: Ultra Wide Band
GSM: Global Mobile System
HSCSD: High speed circuit switched data
DSL: Digital subscriber line
ADSL: Asymmetric DSL
SIM: Subscriber identity Module for GSM
USIM: Universal Subscriber Identity Module

The invention claimed is:

1. A method of conducting data communication from a transmitting device to a receiving device over one or more communication networks, the method comprising:
   determining a natural number, A, of simultaneously receivable communication data links at the receiving device;
   sending the determined natural number from the receiving device to the transmitting device;
   encoding the data into a plurality of versions of the data, wherein the plurality of versions of the data comprises a master version of the data and one or more derived versions of the data, the one or more derived versions of the data being derived from the master version of the data;
   selecting, based on the A simultaneous receivable communication data links, a version of the data from the plurality of versions of the data;
   establishing the A simultaneously receivable communication data links between the transmitting device and the receiving device; and
   transmitting the selected version of data from the transmitting device to the receiving device over the A simultaneously receivable communication data links.

2. The method as claimed in claim 1, further comprising:
   splitting the selected version of the data into a natural number, L, of data streams;
   transmitting the L number of data streams in the A simultaneously receivable communication data links from the transmitting device to the receiving device; and
   combining the data streams for processing at the receiving device.

3. The method as claimed in claim 1, wherein the master version comprises a master media file, and the derived versions differ from the master media file in one or more of a group consisting of resolution file format, audio format, video format, image format, color depth, and contrast.

4. The method as claimed in claim 1, wherein the selected version of the data comprises a digitally encoded voice signal, and the plurality of available versions comprises differently encoded versions of the voice signal.

5. The method as claimed in claim 1, wherein the plurality of versions of the data include different encryption of the selected version of the data.

6. The method as claimed in claim 2, wherein the plurality of versions of the data include different encryption of the selected version of the data and, wherein encrypting is performed before the splitting step.

7. The method as claimed in claim 2, wherein the plurality of versions of the data include different encryption of the selected version of the data and, wherein the encrypting is performed after the splitting step.

8. The method as claimed in claim 1, wherein the plurality of versions of the data include different encoding of the selected version of the data.

9. The method as claimed in claim 2, wherein the plurality of versions of the data include different encoding of the selected version of the data and, wherein the encoding is performed before the splitting step.

10. The method as claimed in claim 2, wherein the plurality of versions of the data include different encoding of the selected version of the data and, wherein the encoding is performed after the splitting step.

11. The method as claimed in claim 1, wherein the determining step comprises a hand shake between the receiving and the transmitting devices.

12. The method as claimed in claim 11, wherein the hand shake comprises user input at the receiving, transmitting or both devices.

13. The method as claimed in claim 2, wherein the transmitting device receives the selected version of the data from a source device.

14. The method as claimed in claim 13, wherein the source device is connected to the transmitting device via a high capacity link.

15. The method as claimed in claim 2, wherein the receiving device transmits the combined data streams to a destination device.

16. The method as claimed in claim 15, wherein the destination device is connected to the receiving device via a high capacity link.

17. The method as claimed in claim 1, wherein the communication data links comprise one of a group consisting of CDMA, GSM, 3G, UMTS, WI-FI, and consisting of WiMAX, LAN, cable, DSL, ADSL, Dial-up and UWB.

18. The method as claimed in claim 1, wherein the communication data links are provided by one or more service providers.

19. A communication device comprising:
   means for determining a natural number, A, of simultaneously receivable communication data links at a receiving device;
   means for sending the determined natural number to a transmitting device;
   means for encoding the data into a plurality of versions of the data, wherein the plurality of versions of the data comprises a master version of the data and one or more derived versions of the data, the one or more derived versions of the data being derived from the master version of the data;

means for selecting, based on the A simultaneously receivable communication data links, a version of the data from a plurality of versions of the data;

means for establishing the A simultaneously receivable communication data links between said communication device and the transmitting device; and means for transmitting the selected version of data over the A simultaneously receivable communication data links.

20. The communication device as claimed in claim 19, further comprising:

means for splitting the selected version of the data into A data streams;

means for combining the data streams received in the A simultaneously receivable communication data links from said transmitting device.

21. A communication system for conducting data communication from a transmitting device to a receiving device over one or more communication networks, the system comprising:

means for determining a natural number, A, of simultaneously receivable communication data links at the receiving device;

means for sending the determined natural number from the receiving device to the transmitting device;

means for encoding the data into a plurality of versions of the data, wherein the plurality of versions of the data comprises a master version of the data and one or more derived versions of the data, the one or more derived versions of the data being derived from the master version of the data;

means for selecting, based on the A simultaneously receivable communication data links, a version of the data for reception from the plurality of versions of the data;

means for establishing the A simultaneously receivable communication data links between the transmitting device and the receiving device; and means for transmitting the selected version of data from the transmitting device to the receiving device over the A simultaneously receivable communication data links.

22. The communication system as claimed in claim 21, further comprising:

means for splitting the selected version of the data into A data streams;

means for transmitting the A data streams in the A simultaneously receivable communication data links from the transmitting device to the receiving device; and means for combining the data streams for processing at the receiving device.

23. A non-transitory computer readable data storage medium having stored thereon computer code means for instructing a computer device to execute a method of conducting data communication from a transmitting device to a receiving device over one or more communication networks, the method comprising:

determining a natural number, A, of simultaneously receivable communication data links at the receiving device;

sending the determined natural number from the receiving device to the transmitting device;

encoding the data into a plurality of versions of the data, wherein the plurality of versions of the data comprises a master version of the data and one or more derived versions of the data, the one or more derived versions of the data being derived from the master version of the data;

selecting, based on the A simultaneously receivable communication data links, a version of the data for reception from the plurality of versions of the data;

establishing the A simultaneously receivable communication data links between the transmitting device and the receiving device; and transmitting the selected version of data from the transmitting device to the receiving device over the A simultaneously receivable communication data links.

* * * * *